US010425857B2

(12) United States Patent
Matsumoto et al.

(10) Patent No.: US 10,425,857 B2
(45) Date of Patent: Sep. 24, 2019

(54) USER TERMINAL, BASE STATION, AND COMMUNICATION APPARATUS

(71) Applicant: KYOCERA CORPORATION, Kyoto (JP)

(72) Inventors: Naohisa Matsumoto, Higashiomi (JP); Takahiro Saiwai, Yokohama (JP); Kugo Morita, Higashiomi (JP)

(73) Assignee: KYOCERA Corporation, Kyoto (JP)

( * ) Notice: Subject to any disclaimer, the term of this patent is extended or adjusted under 35 U.S.C. 154(b) by 55 days.

(21) Appl. No.: 15/706,509

(22) Filed: Sep. 15, 2017

(65) Prior Publication Data
US 2018/0020375 A1 Jan. 18, 2018

Related U.S. Application Data

(63) Continuation of application No. PCT/JP2016/058537, filed on Mar. 17, 2016.

(60) Provisional application No. 62/145,880, filed on Apr. 10, 2015, provisional application No. 62/134,168, filed on Mar. 17, 2015.

(51) Int. Cl.
H04W 28/06 (2009.01)
H04W 72/08 (2009.01)
H04W 72/12 (2009.01)
H04W 84/12 (2009.01)
H04W 88/02 (2009.01)
H04W 88/12 (2009.01)

(52) U.S. Cl.
CPC ............ *H04W 28/06* (2013.01); *H04W 72/08* (2013.01); *H04W 72/12* (2013.01); *H04W 84/12* (2013.01); *H04W 88/02* (2013.01); *H04W 88/12* (2013.01)

(58) Field of Classification Search
CPC ..... H04W 28/06; H04W 72/12; H04W 72/08; H04W 84/12; H04W 88/12; H04W 88/02
See application file for complete search history.

(56) References Cited

U.S. PATENT DOCUMENTS

2016/0066294 A1* 3/2016 Luo .................. H04W 56/0045
370/336

OTHER PUBLICATIONS

International Search Report issued in PCT/JP2016/058537; dated Jun. 7, 2016.
(Continued)

Primary Examiner — Jae Y Lee
(74) Attorney, Agent, or Firm — Studebaker & Brackett PC

(57) ABSTRACT

A user terminal according to first to third embodiments is used in a mobile communication system defined to observe a use state of an unlicensed band channel within an observation period before transmitting an uplink signal within an uplink transmission period in the channel. The user terminal includes a controller configured to perform transmission restriction to restrict transmission of the uplink signal during a last fixed section or a first fixed section of the uplink transmission period when transmitting the uplink signal within the uplink transmission period in the channel.

3 Claims, 22 Drawing Sheets

(56) References Cited

OTHER PUBLICATIONS

3rd Generation Partnership Project; Technical Specification Group Radio Access Network; Study on Licensed-Assisted Access to Unlicensed Spectrum; 3GPP TR36.889 V0.1.1; Nov. 2014; pp. 1-40; Release 13; 3GPP Organizational Partners.
ZTE; "Analysis of PHY Layer Solutions for LAA Design"; 3GPP TSG-RAN WG1 Meeting #79; R1-144825; Nov. 17-21, 2014; pp. 1-9; San Francisco, USA.
Samsung; "Potential Impact of LBT Support for LAA"; 3GPP TSG-RAN WG2 Meeting #89; R2-150444; Feb. 9-13, 2015; pp. 1-4; Athens, Greece.

* cited by examiner

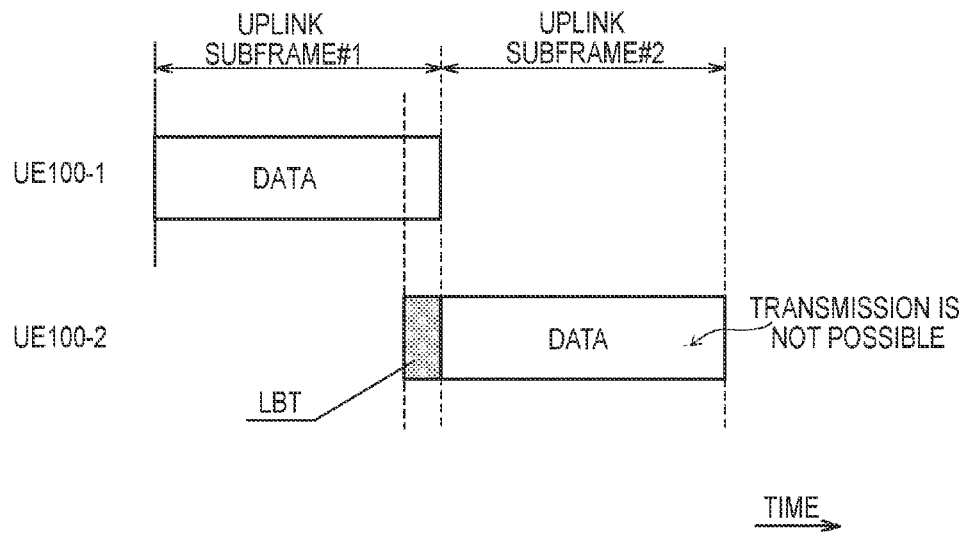
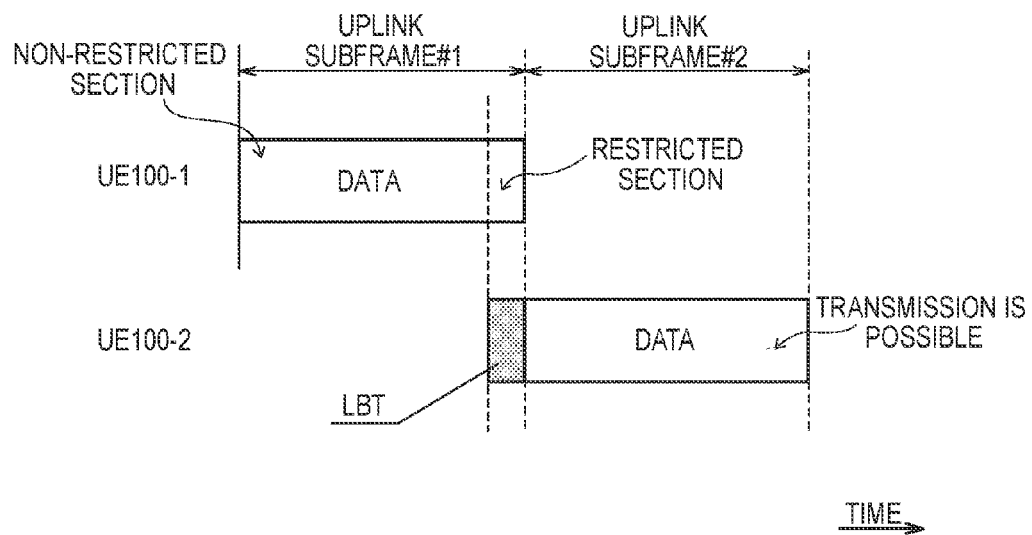

USER TERMINAL, BASE STATION, AND COMMUNICATION APPARATUS

RELATED APPLICATION

This application is a continuation application of international application PCT/JP2016/058537, filed Mar. 17, 2016, which claims the benefit of U.S. Provisional Application No. 62/134,168 (filed on Mar. 17, 2015) and U.S. Provisional Application No. 62/145,880 (filed on Apr. 10, 2015), the entire contents of which are incorporated herein by reference.

TECHNICAL FIELD

The present disclosure relates to a user terminal, a base station, and a communication apparatus used in a mobile communication system.

BACKGROUND ART

In the 3rd Generation Partnership Project (3GPP) that is a mobile communication system standardization project, attempts have been made to enhance Long Term Evolution (LTE) in order to meet rapidly increasing traffic demands.

As one of such attempts, it has been studied to use not only a frequency band (licensed band) for which a license is granted to an operator but also a frequency band (unlicensed band) for which a license is unnecessary in LTE communication.

In the unlicensed band, a listen-before-talk (LBT) procedure is required to avoid interference with other system (wireless LAN or the like) different from an LTE system or with an LTE system of other operator.

The LBT procedure is a procedure that confirms whether or not a frequency channel (carrier) of an unlicensed band is clear based on received power (interference power) and uses the channel only in the case of being confirmed as a clear channel (see Non-Patent Literature 1).

SUMMARY

A user terminal according to a first aspect is used in a mobile communication system defined to observe a use state of an unlicensed band channel within an observation period before transmitting an uplink signal within an uplink transmission period in the channel. The user terminal includes a controller configured to perform transmission restriction to restrict transmission of the uplink signal during a last fixed section or a first fixed section of the uplink transmission period when transmitting the uplink signal within the uplink transmission period in the channel.

A base station according to a second aspect is used in a mobile communication system defined to observe a use state of an unlicensed band channel within an observation period before transmitting an uplink signal within an uplink transmission period in the channel. The base station includes a controller configured to allocate an uplink transmission period that needs to be used for transmission of the uplink signal to a user terminal. The controller is configured to perform allocation restriction not to allocate a plurality of consecutive uplink transmission periods to a plurality of user terminal that are close to each other.

A communication apparatus according to a third aspect is used in a mobile communication system, in which listen before talk (LBT) to observe a use state of an unlicensed band channel within an observation period before transmitting a radio signal in the channel is defined. The communication apparatus includes a controller configured to select any one of schemes of a frame based equipment (FBE) and a load based equipment (LBE), as a scheme of the LBT that needs to be used by a communication partner device or a scheme of the LBT that needs to be used by the communication apparatus.

A base station according to a fourth aspect includes a controller configured to set a period of prohibition of transmission and reception of data in order to observe a use state of a channel, between the end of an uplink traffic and start of an downlink traffic, when traffic is switched from the uplink to the downlink in time division duplex (TDD).

A base station according to a fifth aspect includes: a receiver configured to receive a measurement result of a signal from a user terminal and/or a base station from a plurality of user terminals; and a controller configured to select two user terminals, which are as a pair of multiuser multiple input multiple output (MIMO), based on the measurement result.

BRIEF DESCRIPTION OF DRAWINGS

FIGS. 8A and 8B are views for describing an operation of a UE 100 according to a first embodiment.

DESCRIPTION OF EMBODIMENTS

[Overview of Embodiment]

Figure 1:
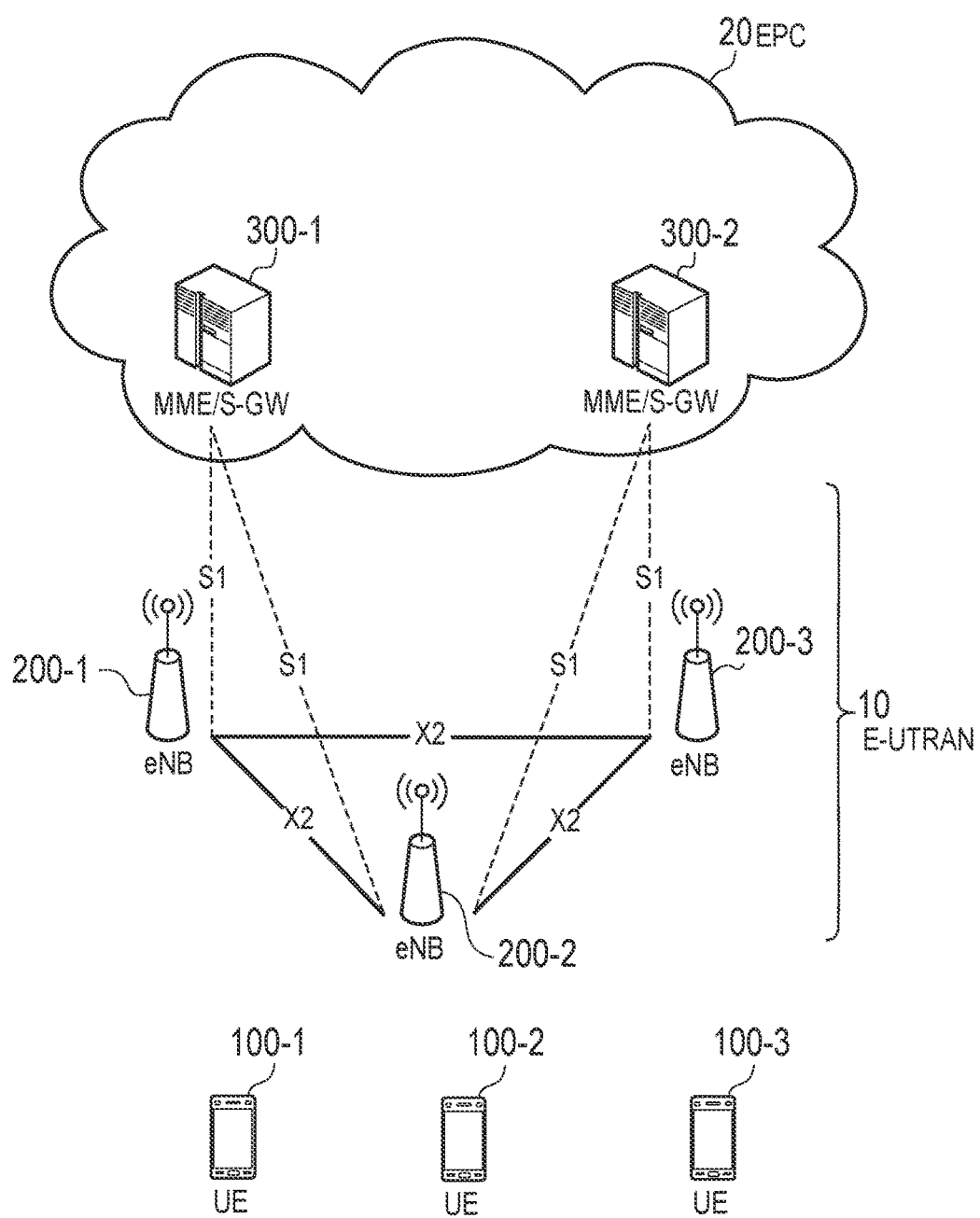
FIG. 1 is a configuration diagram of a mobile communication system (LTE system) according to an embodiment.

It is possible to apply LTE communication using an unlicensed band not only to a downlink but also an uplink. A user terminal that performs uplink communication in an unlicensed band channel needs to observe a use state of the channel within an observation period before transmitting uplink transmission to a base station.

Therefore, an object of the embodiment is to enable a mobile communication system to appropriately perform communication using an unlicensed band.

A user terminal according to first to third embodiments is used in a mobile communication system defined to observe a use state of an unlicensed band channel within an observation period before transmitting an uplink signal within an uplink transmission period in the channel. The user terminal includes a controller configured to perform transmission restriction to restrict transmission of the uplink signal during a last fixed section or a first fixed section of the uplink transmission period when transmitting the uplink signal within the uplink transmission period in the channel.

In the first to third embodiments, the transmission restriction may be stop of transmission of the uplink signal.

In the first to third embodiments, the fixed section may have a time length of at least the observation period.

In the second embodiment, the controller may be configured to perform the transmission restriction in response to an instruction from a base station.

In the third embodiment, the controller may be configured to autonomously perform the transmission restriction based on a radio signal received from other user terminal.

In the third embodiment, the controller may be configured to notify the base station that the transmission restriction is to be performed, in the case of performing the transmission restriction.

In the third embodiment, the controller may be configured to perform puncturing to discard an uplink signal that needs to be transmitted within the fixed section, in the case of performing the transmission restriction.

A base station according to a second embodiment is used in a mobile communication system defined to observe a use state of an unlicensed band channel within an observation period before transmitting an uplink signal within an uplink transmission period in the channel. The base station includes a controller configured to allocate an uplink transmission period that needs to be used for transmission of the uplink signal to a user terminal. The controller is configured to perform allocation restriction not to allocate a plurality of consecutive uplink transmission periods to a plurality of user terminal that are close to each other.

In the second embodiment, the controller may be configured to allocate a plurality of consecutive uplink transmission periods only to a plurality of user terminals that are not close to each other.

In the second embodiment, the controller may be configured to specify, based on proximity terminal notification transmitted from one user terminal, other user terminal close to the one user terminal. The proximity terminal notification includes terminal identification information to specify the other user terminal.

In the second embodiment, when allocating one uplink transmission period to one user terminal and allocating a subframe subsequent to the one uplink transmission period to other user terminal close to the one user terminal, the controller may be configured to instruct the one user terminal to restrict transmission of the uplink signal during a last fixed section or a first fixed section of the one uplink transmission period.

In the second embodiment, when allocating one uplink transmission period and an uplink transmission period subsequent to the one uplink transmission period to the one user terminal, the controller may be configured to instruct the one user terminal not to perform transmission restriction of the uplink signal for the one uplink transmission period.

A communication apparatus according to a fourth embodiment is used in a mobile communication system, in which listen before talk (LBT) to observe a use state of an unlicensed band channel within an observation period before transmitting a radio signal in the channel is defined. The communication apparatus includes a controller configured to select any one of schemes of a frame based equipment (FBE) and a load based equipment (LBE), as a scheme of the LBT that needs to be used by a communication partner device or a scheme of the LBT that needs to be used by the communication apparatus.

In the fourth embodiment, the controller may be configured to transmit LBT setting information to designate the selected LBT scheme to the communication partner device when the LBT scheme that needs to be used by the communication partner device is selected.

In the fourth embodiment, the controller may be configured to select any one of the FBE and the LBE schemes based on a degree of congestion of the channel and/or a characteristic of data included in the radio signal.

In the fourth embodiment, the controller may be configured to select any one of the FBE and the LBE schemes based on the LBT scheme that is being used by other detected communication apparatus.

In the fourth embodiment, the controller may be configured to select the FBE in response to start of uplink communication.

A base station according to a fifth embodiment includes a controller configured to set a period of prohibition of transmission and reception of data in order to observe a use state of a channel, between the end of an uplink traffic and start of an downlink traffic, when traffic is switched from the uplink to the downlink in time division duplex (TDD).

In the fifth embodiment, the controller may be configured to delete a partial symbol of a subframe used for the uplink traffic or delete a partial symbol of a subframe used for the downlink traffic when the prohibition period is provided.

In the fifth embodiment, the partial symbol of the subframe used for the uplink traffic may be a last symbol of the subframe.

In the fifth embodiment, the partial symbol of the subframe used for the downlink traffic may be a first symbol of the subframe.

A base station according to a sixth embodiment includes: a receiver configured to receive a measurement result of a signal from a user terminal and/or a base station from a plurality of user terminals; and a controller configured to select two user terminals, which are as a pair of multiuser multiple input multiple output (MIMO), based on the measurement result.

In the sixth embodiment, the controller may be configured to select two user terminals for which the user terminal and/or the base station included in the measurement result do not overlap each other among the plurality of user terminals, as the multiuser MIMO pair.

In the sixth embodiment, the controller may be configured to select two user terminals having a lowest overlapping ratio of the user terminal and/or the base station included in the measurement result among the plurality of user terminals, as the multiuser MIMO pair.

[Mobile Communication System According to Embodiment]

(System Configuration)

Hereinafter, an LTE system which is a mobile communication system according to an embodiment will be described. FIG. 1 is a diagram illustrating a configuration of the LTE system.

As illustrated in FIG. 1, the LTE system includes a user equipment (UE) 100, an evolved-UMTS terrestrial radio access network (E-UTRAN) 10, and an evolved packet core (EPC) 20.

The UE 100 corresponds to a user terminal. The UE 100 is a mobile communication apparatus and performs radio communication with a cell (serving cell). A configuration of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. A configuration of the eNB 200 will be described later.

The eNB 200 manages one or a plurality of cells and performs radio communication with the UE 100 that establishes a connection with its own cell. The eNB 200 has a radio resource management (RRM) function, a routing function of user data (hereinafter, referred to simply as "data"), a measurement control function for mobility control and scheduling, and the like. The "cell" is used not only as a term indicating a minimum unit of a radio communication area but also as a term indicating a function of performing radio communication with the UE 100.

The EPC 20 corresponds to a core network. The EPC 20 includes a Mobility Management Entity (MME)/Serving-Gateway (S-GW) 300. The MME performs various types of mobility control and the like with respect to the UE 100. The S-GW performs data transfer control. The MME/S-GW 300 is connected to the eNB 200 via an S1 interface. The E-UTRAN 10 and the EPC 20 form a network.

Figure 2:
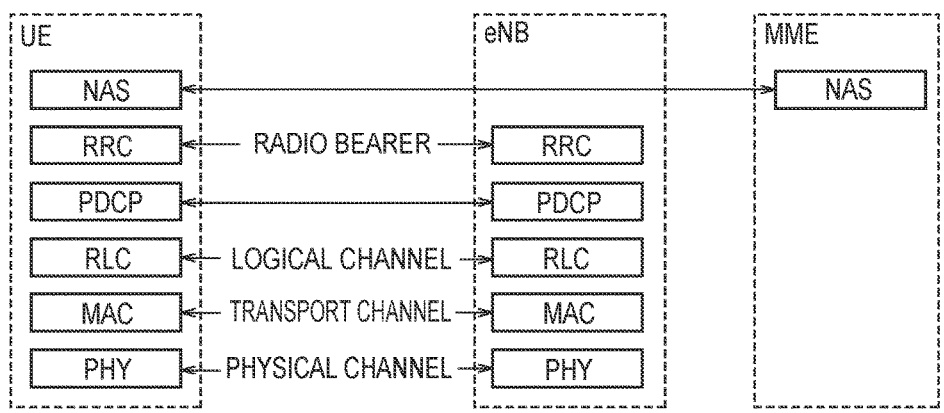
FIG. 2 is a protocol stack diagram of a radio interface according to the embodiment.

FIG. 2 is a protocol stack diagram of a radio interface in the LTE system. As illustrated in FIG. 2, a radio interface protocol is divided into a first layer to a third layer of an OSI reference model, and the first layer is a physical (PHY) layer. The second layer includes a medium access control (MAC) layer, a radio link control (RLC) layer, and a packet data convergence protocol (PDCP) layer. The third layer includes a radio resource control (RRC) layer.

The physical layer performs coding and decoding, modulation and demodulation, antenna mapping and demapping, and resource mapping and demapping. Data and a control signal are transmitted via a physical channel between a physical layer of the UE 100 and a physical layer of the eNB 200.

The MAC layer performs priority control of data, and a retransmission process and the like by hybrid ARQ (HARQ), and a random access procedure, and the like. Data and a control signal are transmitted via a transport channel between a MAC layer of the UE 100 and a MAC layer of the eNB 200. The MAC layer of the eNB 200 includes a transport format of an uplink and a downlink (a transport block size, a modulation and coding scheme (MCS)) and a scheduler to determine (schedule) an allocated resource block to the UE 100.

The RLC layer transmits data to the RLC layer of a reception side using the functions of the MAC layer and the physical layer. Data and a control signal are transmitted via a logical channel between an RLC layer of the UE 100 and an RLC layer of the eNB 200.

The PDCP layer performs header compression and decompression, and encryption and decryption.

The RRC layer is defined only in a control plane handling the control signal. A message (RRC message) for various types of setting is transmitted between an RRC layer of the UE 100 and an RRC layer of the eNB 200. The RRC layer controls the logical channel, the transport channel, and the physical channel in response to establishment, re-establishment, and release of a radio bearer. The UE 100 is in an RRC connected state when there is a connection (an RRC connection) is established between the RRC of the UE 100 and the RRC of the eNB 200, and the UE 100 is in an RRC idle state in the opposite case.

The non-access stratum (NAS) layer positioned above the RRC layer performs session management, mobility management, and the like.

Figure 3:
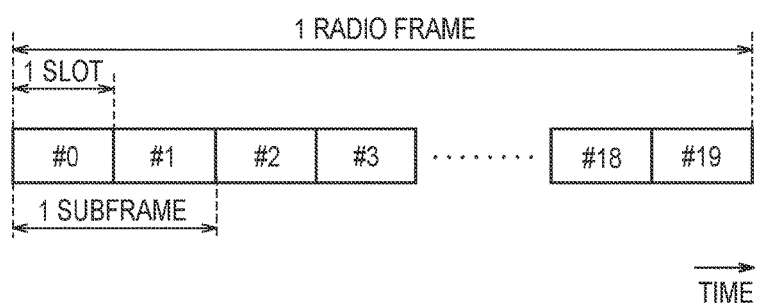
FIG. 3 is a configuration diagram of a radio frame according to the embodiment.

FIG. 3 is a configuration diagram of a radio frame used in the LTE system. In the LTE system, orthogonal frequency division multiple access (OFDMA) and single carrier frequency division multiple access (SC-FDMA) are applied in the downlink and the uplink, respectively.

As illustrated in FIG. 3, the radio frame is configured of ten subframes arranged in a time direction. Each subframe is configured of two slots arranged in the time direction. A length of each subframe is 1 ms, and a length of each slot is 0.5 ms. Each subframe includes a plurality of resource blocks (RBs) in a frequency direction, and a plurality of symbols in the time direction. Each resource block includes a plurality of subcarriers in the frequency direction. One resource element (RE) is configured of one symbol and one subcarrier. In addition, a frequency resource can be specified by the resource block among radio resources (time and frequency resources) allocated to the UE 100, and a time resource can be specified by the subframe (or the slot).

In the downlink, an interval of several symbols at the head of each subframe is a region used as a physical downlink control channel (PDCCH) mainly configured to transmit a downlink control signal. Details of the PDCCH will be described later. In addition, the remaining portion of each subframe is a region that can be used as a physical downlink shared channel (PDSCH) mainly configured to transmit downlink data.

In the uplink, both ends in the frequency direction of each subframe are regions used as a physical uplink control channel (PUCCH) mainly configured to transmit an uplink control signal. The remaining portion of each subframe is a region that can be used as a physical uplink channel (PUSCH) mainly configured to transmit uplink data.

(Unlicensed Band)

In the LTE system according to the embodiment, not only a licensed band for which a license has been granted to an operator but also an unlicensed band for which a license is unnecessary is used for LTE communication. Specifically, the unlicensed band is accessible with the aid of the licensed band. Such a mechanism is called licensed-assisted access (LAA).

Figure 4:
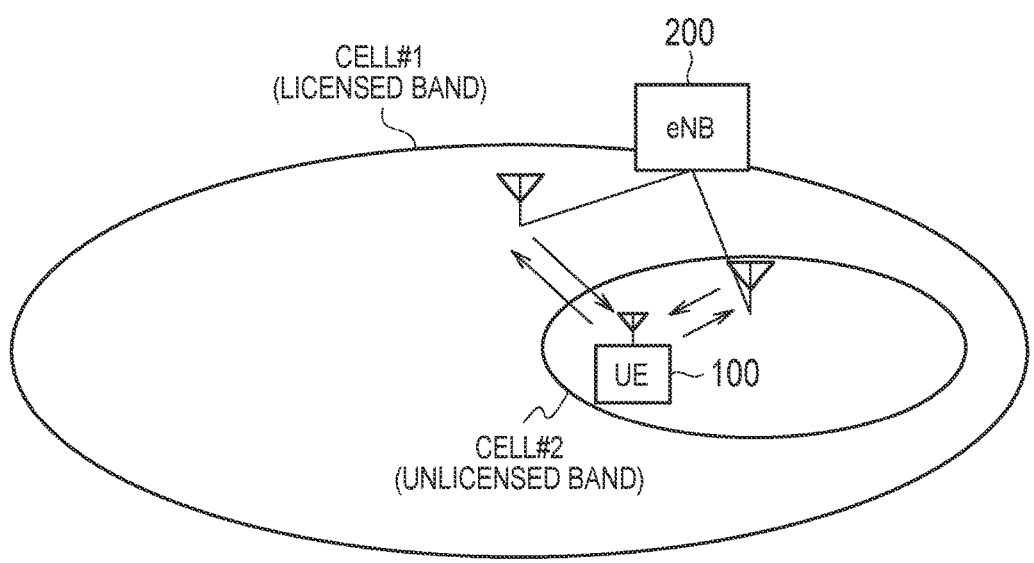
FIG. 4 is a view for describing LAA according to the embodiment.

FIG. 4 is a diagram for describing the LAA. As illustrated in FIG. 4, the eNB 200 manages a cell #1 to be operated in the licensed band and a cell #2 to be operated in the unlicensed band. FIG. 4 illustrates an example in which the cell #1 is a macro the cell and the cell #2 is a small cell, but the cell size is not limited thereto.

The UE 100 is positioned in an overlapping area of the cell #1 and the cell #2. The UE 100 sets the cell #2 as a secondary cell (SCell) while setting the cell #1 as the primary cell (PCell) and performs communication using carrier aggregation (CA).

In the example of FIG. 4, the UE 100 performs uplink communication and downlink communication with the cell #1, and performs uplink communication and downlink communication with the cell #2. An unlicensed band radio resource is provided to the UE 100 in addition to a licensed band radio resource through such carrier aggregation, and thus, it is possible to improve throughput.

In the embodiment, the uplink communication in the cell #2 (unlicensed band) will be mainly described.

(LBT)

In the unlicensed band, a listen-before-talk (LBT) procedure is required to avoid interference with other system (wireless LAN or the like) different from an LTE system or with an LTE system of other operator. The LBT procedure is a procedure that confirms whether or not a channel (carrier) of an unlicensed band is clear based on received power (interference power) and uses the channel only in the case of being confirmed as a clear channel.

In the embodiment, before transmitting a radio signal (a control signal or data) in an unlicensed band channel, the UE 100 observes a use state of the channel within an observation period having a predetermined time length and confirms whether or not the channel is the clear channel. Hereinafter, the observation period is referred to as an "LBT period".

Figure 5:
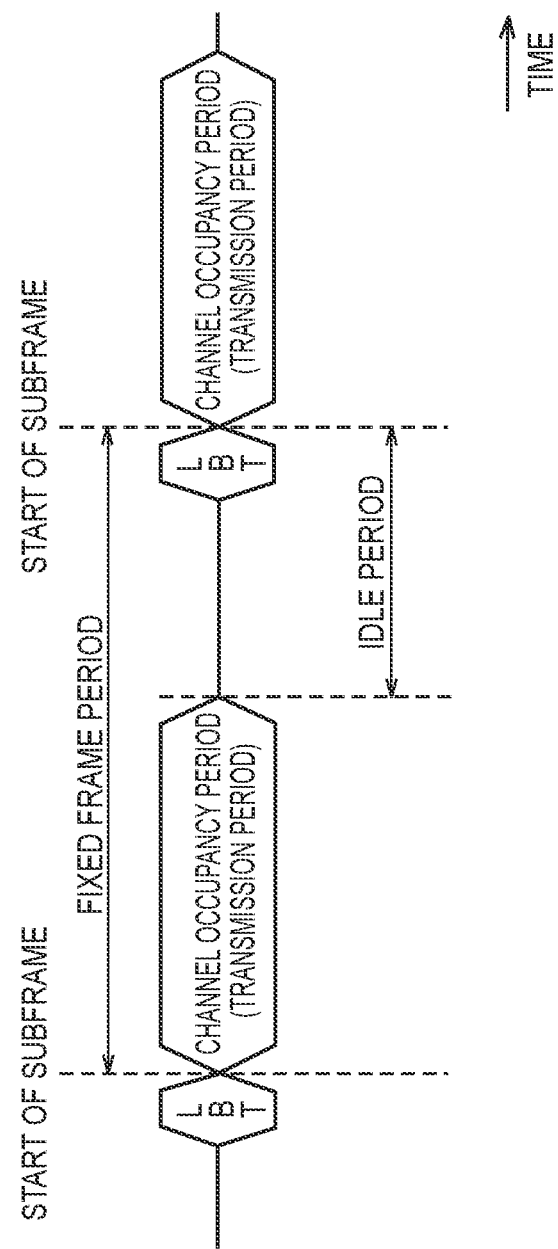
FIG. 5 is a view for describing LBT according to the embodiment.

FIG. 5 is a view for describing the LBT according to the embodiment. In the embodiment, a frame based equipment (FBE) which is one type of LBT will be mainly described. The FBE is not demand-driven system, but a system in which a timing is fixed. On the other hand, a load based equipment (LBE) which is other scheme of LBT is a demand-driven scheme in which a timing is not fixed.

The eNB 200 allocates an uplink transmission period that needs to be used for uplink transmission in the unlicensed channel to the UE 100. In the embodiment, the uplink transmission period is an uplink subframe. Specifically, the eNB 200 transmits allocation subframe information indicating at least one uplink subframe (candidate subframe) to the UE 100. Incidentally, it is assumed that the uplink transmission is performed using the entire band of the channel without performing scheduling in the frequency direction for the unlicensed band channel in the embodiment.

As illustrated in FIG. 5, the UE 100 observes the use state of the unlicensed channel within the LBT period immediately before the allocated uplink subframe. The LBT period is, for example, 20 µs or more. When a reception power (interference power) of a predetermined amount or more is detected within the LBT period, the UE 100 determines that the channel is in use and does not use the channel.

On the other hand, when the reception power (interference power) of the predetermined amount or more is not detected within the LBT period, the UE 100 determines that the channel is clear and performs transmission using the channel only for the uplink transmission period (channel occupancy period). The channel occupancy period is, for example, within a range of 1 [ms] to 10 [ms]. In the embodiment, the channel occupancy period has a time length of 1 [ms] that corresponds to one subframe. Alternatively, the channel occupancy period may have a time length of n [ms] that corresponds to n subframes (n≥2). The UE 100 does not perform the uplink transmission within an idle period after a lapse of the channel occupancy period. The idle period is, for example, a period longer than 5% of the channel occupancy period.

(User Terminal)

Figure 6:
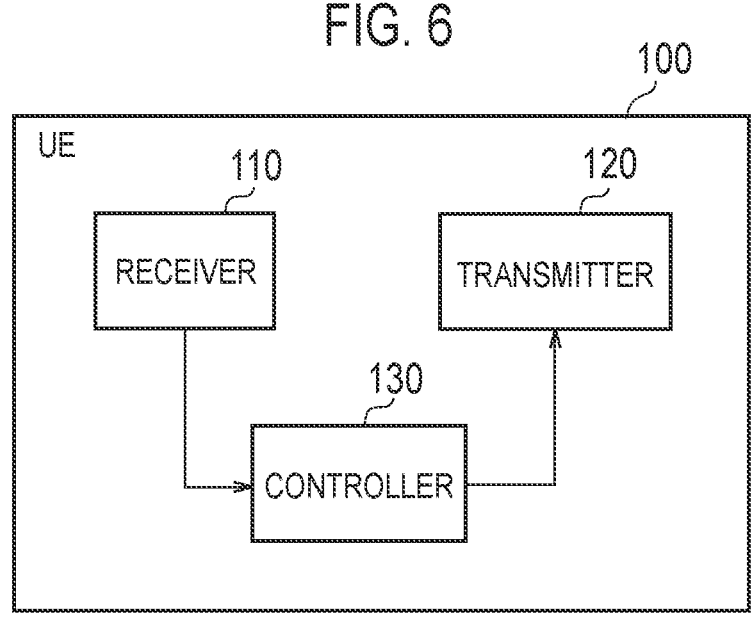
FIG. 6 is a block diagram of a user terminal (UE) according to the embodiment.

Hereinafter, the UE 100 (user terminal) according to the embodiment will be described. FIG. 6 is a block diagram of the UE 100. As illustrated in FIG. 6, the UE 100 includes a receiver 110, a transmitter 120, and a controller 130.

The receiver 110 performs various types of reception under control of the controller 130. The receiver 110 includes an antenna and a receiving machine. The receiving machine converts a radio signal received by the antenna to a baseband signal (reception signal) and outputs the converted signal to the controller 130. The receiver 110 may include a first receiving machine to receive a radio signal in the licensed band and a second receiving machine to receive a radio signal in the unlicensed band.

The transmitter 120 performs various types of transmission under control of the controller 130. The transmitter 120 includes an antenna and a transmitting machine. The transmitting machine converts a baseband signal (transmission signal) output from the controller 130 to a radio signal and transmits the converted signal from the antenna. The transmitter 120 may include a first transmitting machine to transmit a radio signal in the licensed band and a second transmitting machine to transmit a radio signal in the unlicensed band.

The controller 130 performs various types of control in the UE 100. The controller 130 includes a processor and a memory. The memory stores a program to be executed by the processor and information used for processing performed by the processor. The processor includes a baseband processor that performs modulation and demodulation, encoding and decoding, and the like of the baseband signal, and a central processing unit (CPU) that executes the program stored in the memory to perform various processes. The processor may include a codec to perform encoding and decoding of audio and video signals. The processor executes various processes to be described later and various communication protocols described above.

(Base Station)

Figure 7:
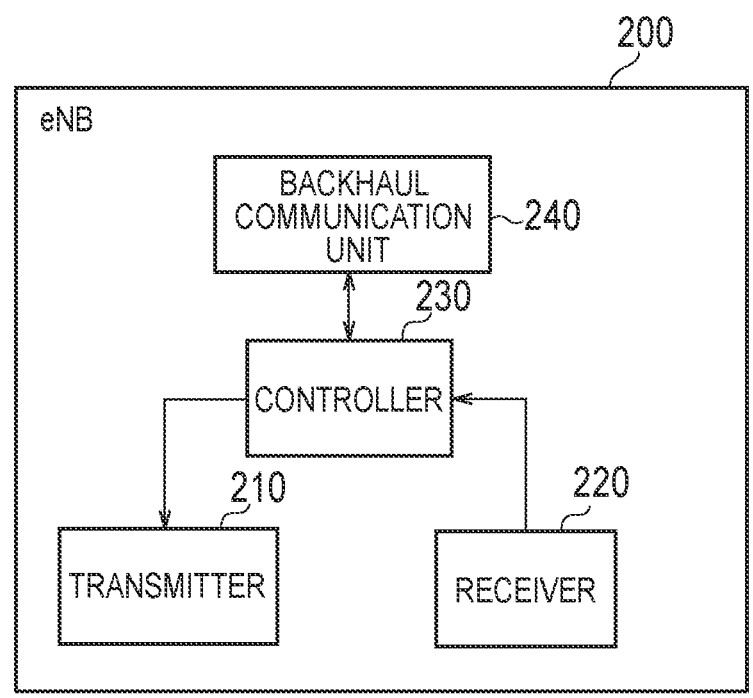
FIG. 7 is a block diagram of a base station (eNB) according to the embodiment.

Hereinafter, a configuration of the eNB 200 (base station) will be described. FIG. 7 is a block diagram of the eNB 200. As illustrated in FIG. 7, the eNB 200 includes a transmitter 210, a receiver 220, a controller 230, and a backhaul communication unit 240.

The transmitter 210 performs various types of transmissions under control of the controller 230. The transmitter 210 includes an antenna and a transmitting machine. The transmitting machine converts a baseband signal (transmission signal) output from the controller 230 to a radio signal and transmits the converted signal from the antenna. The transmitter 210 may include a first transmitting machine that transmits a radio signal in the licensed band and a second transmitting machine that transmits a radio signal in the unlicensed band.

The receiver 220 performs various types of reception under control of the controller 230. The receiver 220 includes an antenna and a receiving machine. The receiving machine converts a radio signal received by the antenna into a baseband signal (reception signal) and outputs the converted signal to the controller 230. The receiver 220 may include a first receiving machine to receive a radio signal in the licensed band and a second receiving machine to receive a radio signal in the unlicensed band.

The controller 230 performs various types of control in the eNB 200. The controller 230 includes a processor and a memory. The memory stores a program to be executed by the processor and information used for processing performed by the processor. The processor includes a baseband processor that performs modulation and demodulation, encoding and decoding, and the like of the baseband signal, and a central processing unit (CPU) that executes the program stored in the memory to perform various processes. The processor executes various processes to be described later and various communication protocols described above.

The backhaul communication unit 240 is connected to the adjacent eNB 200 via the X2 interface and is connected to the MME/S-GW 300 via the S1 interface. The backhaul communication unit 240 is used for communication performed on the X2 interface, communication performed on the S1 interface, and the like.

[First Embodiment]
(Operation of User Terminal)

Hereinafter, an operation of the UE 100 (user terminal) according to a first embodiment will be described. FIGS. 8A and 8B are views for describing the operation of the UE 100 according to the first embodiment.

A scenario is assumed in which a UE 100-1 transmits an uplink signal (data) within an uplink subframe #1 in an unlicensed band channel, and then, a UE 100-2 transmits an uplink signal (data) within an uplink subframe #2 which is consecutive (succeeding) to the uplink subframe #1 as illustrated in FIG. 8A. Although FIGS. 8A and 8B illustrate an example in which uplink transmission is performed for data, the uplink transmission may include a control signal.

In the scenario illustrated in FIG. 8A, when the UE 100-1 and the UE 100-2 are close to each other, the UE 100-2 observes the uplink signal of the UE 100-1 within the LBT period prior to the uplink subframe #2 and determines that the corresponding channel is in use. Accordingly, even if the uplink subframe #2 is allocated by the eNB 200, it is difficult for the UE 100-2 to transmit the uplink signal using the uplink subframe #2.

Thus, when transmitting the uplink signal within the uplink subframe #1 n the unlicensed band channel, the controller 130 of the UE 100-1 according to the first embodiment performs transmission restriction to restrict transmission of the uplink signal during a last fixed section (hereinafter. referred to as "restricted section") of the uplink subframe #1 as illustrated in FIG. 8B. Accordingly, even when the UE 100-2 is close to the UE 100-1, the UE 100-1 does not observe the uplink signal of the UE 100-1 within the LBT period prior to the uplink subframe #2, and determines that the channel is a clear channel. Accordingly, the UE 100-2 to which the uplink subframe #2 is allocated by the eNB 200 can transmit the uplink signal using the uplink subframe #2.

In the first embodiment, the transmission restriction of the uplink signal is stop of transmission of the uplink signal (data). For example, the controller 130 of the UE 100-1 does not arrange data within the restricted section but arranges data within a non-restricted section. Alternatively, the transmission restriction of the uplink signal may be making transmission power of the uplink signal (data) within the restricted section extremely smaller than that within the non-restricted section.

In the first embodiment, the restricted section has a time length of at least the LBT period. The time length of the restricted section may be the same as the time length (for example, 20 [μs]) of the LBT period.

The controller 130 of the UE 100-1 may perform the above-described transmission restriction in response to an instruction from the eNB 200 as will be described later.

(Example of Operation Sequence)

Figure 9:
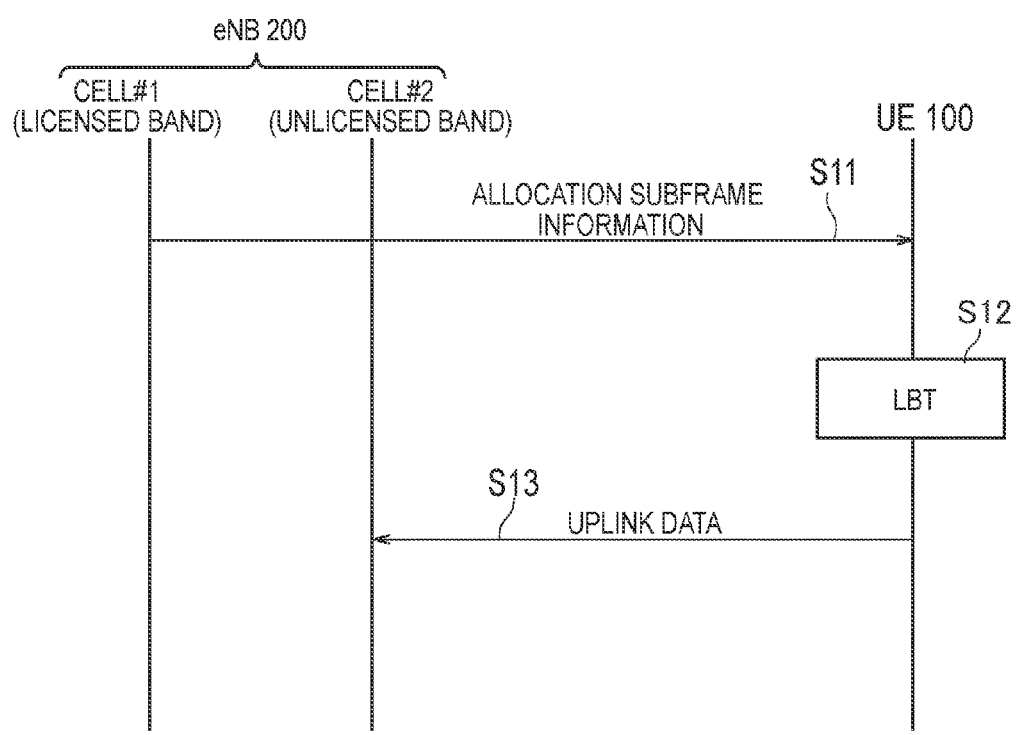
FIG. 9 is a view illustrating an example of an operation sequence according to the first embodiment.

Hereinafter, an example of an operation sequence according to the first embodiment will be described on the premise of operation environment illustrated in FIG. 4. FIG. 9 is a view illustrating the example of the operation sequence according to the first embodiment.

As illustrated in FIG. 9, the eNB 200 transmits allocation subframe information to the UE 100 via the cell #1 operated in a licensed band in Step S11. The UE 100 receives the allocation subframe information. The allocation subframe information is information indicating an allocation uplink subframe in an unlicensed band channel. The allocation uplink subframe is transmitted from the eNB 200 to the UE 100 using an individual RRC message or a PDCCH.

In Step S12, the UE 100 determines whether or not to use the uplink subframe indicated by the allocation subframe information by observing (LBT) the unlicensed band channel. Here, the description is given assuming that the UE 100 determines to use the uplink subframe indicated by the allocation subframe information.

In Step S13, the UE 100 transmits the uplink signal to the eNB 200 via the unlicensed band channel in the uplink subframe indicated by the allocation subframe information. The UE 100 may transmit the uplink signal using the entire band of the unlicensed band channel. Here, the UE 100 restricts the transmission of the uplink signal during the last fixed section (restricted section) of the uplink subframe. The eNB 200 receives the uplink signal via the cell #2 (the unlicensed band).

[Second Embodiment]

A difference of a second embodiment from the first embodiment will be mainly described.

(Operation According to Second Embodiment)

Hereinafter, an operation according to a second embodiment will be described.

As described with reference to FIGS. 8A and 8B, when the UE 100-1 and the UE 100-2 are close (adjacent) to each other, the UE 100-2 observes the uplink signal of the UE 100-1 within the LBT period prior to an uplink subframe even if the uplink subframe is allocated thereto by the eNB 200, and thus, hardly transmit the uplink signal using the uplink subframe.

On the other hand, when the UE 100-1 and the UE 100-2 are not close (adjacent) to each other, the UE 100-2 does not observe the uplink signal of the UE 100-1 within the LBT period prior to the uplink subframe. Alternatively, even if the UE 100-2 observes the uplink signal of the UE 100-1, the UE 100-2 can pass the LBT since the reception power of the uplink signal is extremely small. Thus, the UE 100-2 can transmit the uplink signal using the uplink subframe.

Accordingly, consecutive uplink subframes can be appropriately allocated to a plurality of the UEs 100 through scheduling in the eNB 200 in the second embodiment.

The controller 230 of the eNB 200 according to the second embodiment allocates an uplink subframe that needs to be used for transmission of an uplink signal (data) to the UE 100. The controller 230 performs allocation restriction not to allocate a plurality of consecutive uplink subframes with respect to the plurality of UEs 100 which are close to each other. In other words, the controller 230 allocates the plurality of consecutive uplink subframes only to the plurality of UEs 100 which are not close to each other.

In the second embodiment, based on proximity UE notification (neighbor terminal notification) transmitted from one of the UEs 100, the controller 230 of the eNB 200 specifies other UE 100 that is close to the one UE 100. The proximity UE notification includes UE identification information (terminal identification information) configured to specify the other UE 100.

(Example of Operation Sequence)

Figure 10A:
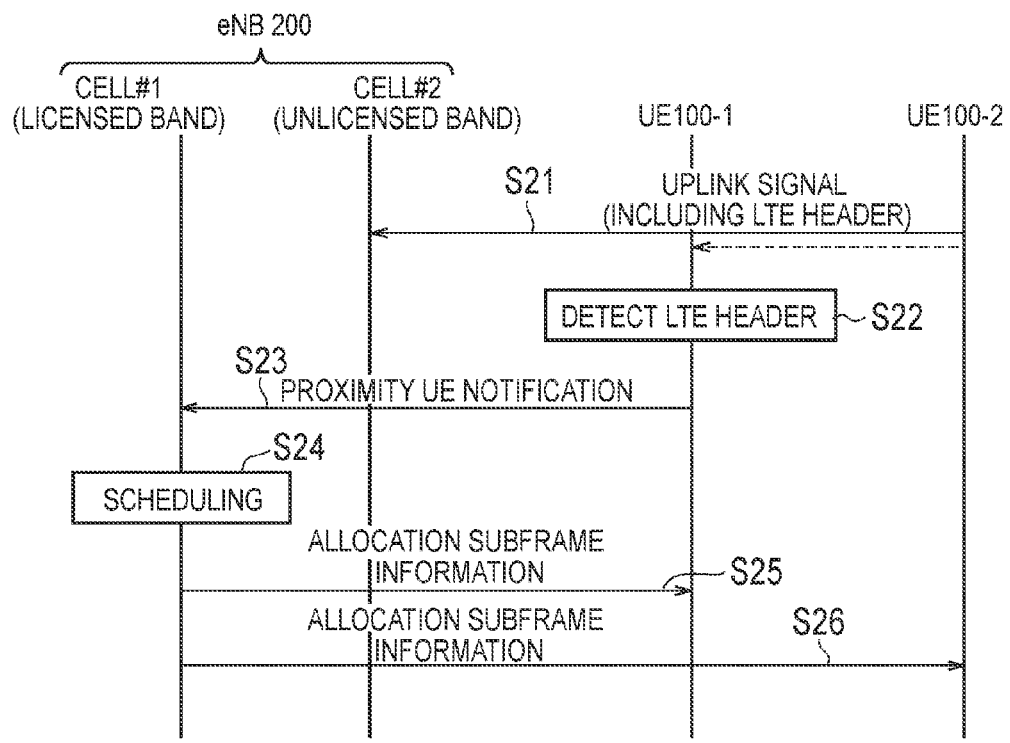
FIGS. 10A and 10B are views illustrating an example of an operation sequence according to a second embodiment.
Figure 10B:
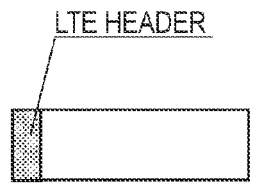

Hereinafter, an operation sequence according to the second embodiment will be described. FIGS. 10A and 10B are views illustrating an example of the operation sequence according to the second embodiment.

As illustrated in FIG. 10A, the UE 100-2 transmits an uplink signal to the eNB 200 via an unlicensed band channel (cell #2) in Step S21. As illustrated in FIG. 10B, an LTE header (LTE header) is added to the uplink signal (data). The "LTE header" includes UE identification information configured to identify the UE 100-2. The "LTE header" may further include at least one of operator identification information configured to identify an operator to which the UE 100-2 belongs and cell identification information configured to identify a cell in which the UE 100-2 exists The UE 100-2 may transmit the "LTE header" in response to an instruction from the eNB 200. The instruction may instruct periodic transmission of the "LTE header".

In Step S22, the UE 100-1 scans the "LTE header" and tries to receive the "LTE header". The UE 100-1 may scan the "LTE header" in response to the need for transmission of the uplink transmission. Alternatively, the UE 100-1 may scan the "LTE header" in response to the instruction from the eNB 200. Here, the description is given assuming that the UE 100-1 detects the "LTE header" of the UE 100-2.

In Step S23, the UE 100-1 transmits the proximity UE notification including information in the detected "LTE header" to the eNB 200 (cell #1). The proximity UE notification may be included in a "MAC Control Element (MCE)" which is signaling of the MAC layer. Alternatively, the proximity UE notification may be included in signaling of the RRC layer.

In Step S24, the eNB 200 performs scheduling based on the proximity UE notification. Here, the eNB 200 specifies the UE 100-2 that is close to the UE 100-1 based on the proximity UE notification transmitted from the UE 100-1. Further, the eNB 200 performs the allocation restriction not to allocate the plurality of contiguous uplink subframes to the plurality of proximity UEs 100 (the UE 100-1 and the UE 100-2).

In Step S25, the eNB 200 transmits the allocation subframe information, which indicates the uplink subframe allocated to the UE 100-1, to the UE 100-1. In addition, the eNB 200 transmits the allocation subframe information, which indicates the uplink subframe allocated to the UE 100-2, to the UE 100-2 in Step S26. When the UE 100-1 and the UE 100-2 are close to each other, the uplink subframes that are not consecutive are allocated to the UE 100-1 and the UE 100-2.

Figure 11:
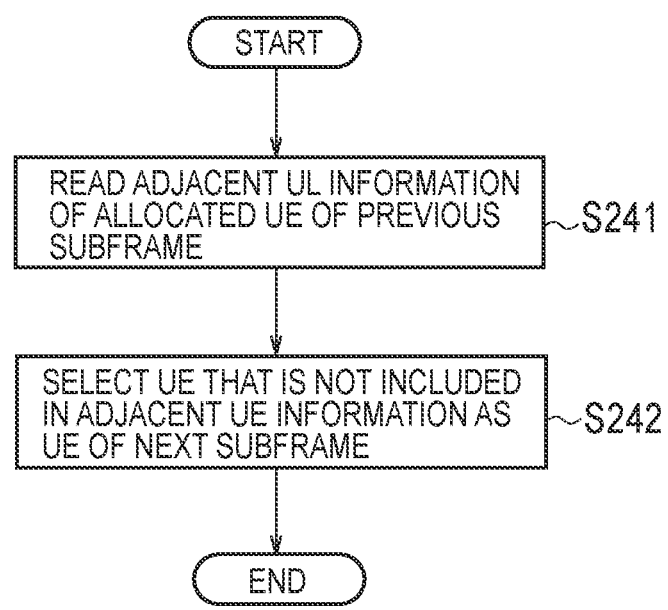
FIG. 11 is a flow diagram illustrating an example of a scheduling operation in the eNB according to the second embodiment.

FIG. 11 is a flow diagram illustrating an example of a scheduling operation (Step S24 in FIGS. 10A and 10B) in the eNB 200 according to the second embodiment. As a premise of this flow, the eNB 200 manages the adjacent UE information that is information of the plurality of UEs 100 that are close (adjacent) to each other. Here, it is assumed a case where the eNB 200 allocates one uplink subframe to one of the UEs 100, and then, determines any one of the UEs 100 to which an uplink subframe subsequent to the one uplink subframe is allocated.

As illustrated in FIG. 11, the eNB 200 reads the adjacent UE information of the one UE 100 in Step S241.

In Step S242, the eNB 200 allocates the uplink subframe subsequent to the one uplink subframe to the UE 100 that is not included in the adjacent UE information.

[First Modified Example of Second Embodiment]

In a first modified example of the second embodiment, the eNB 200 performs the following operation in addition to the operation according to the second embodiment. Specifically, when one uplink subframe is allocated to one of the UEs 100, and a subframe subsequent to the one uplink subframe is allocated to the other UE 100 that is close to the one UE 100, the controller 230 of the eNB 200 instructs the one UE 100 to limit transmission of an uplink signal during the last fixed section of the one uplink subframe. The controller 130 of the one UE 100 performs the transmission restriction in response to the instruction from the eNB 200.

Figure 12:
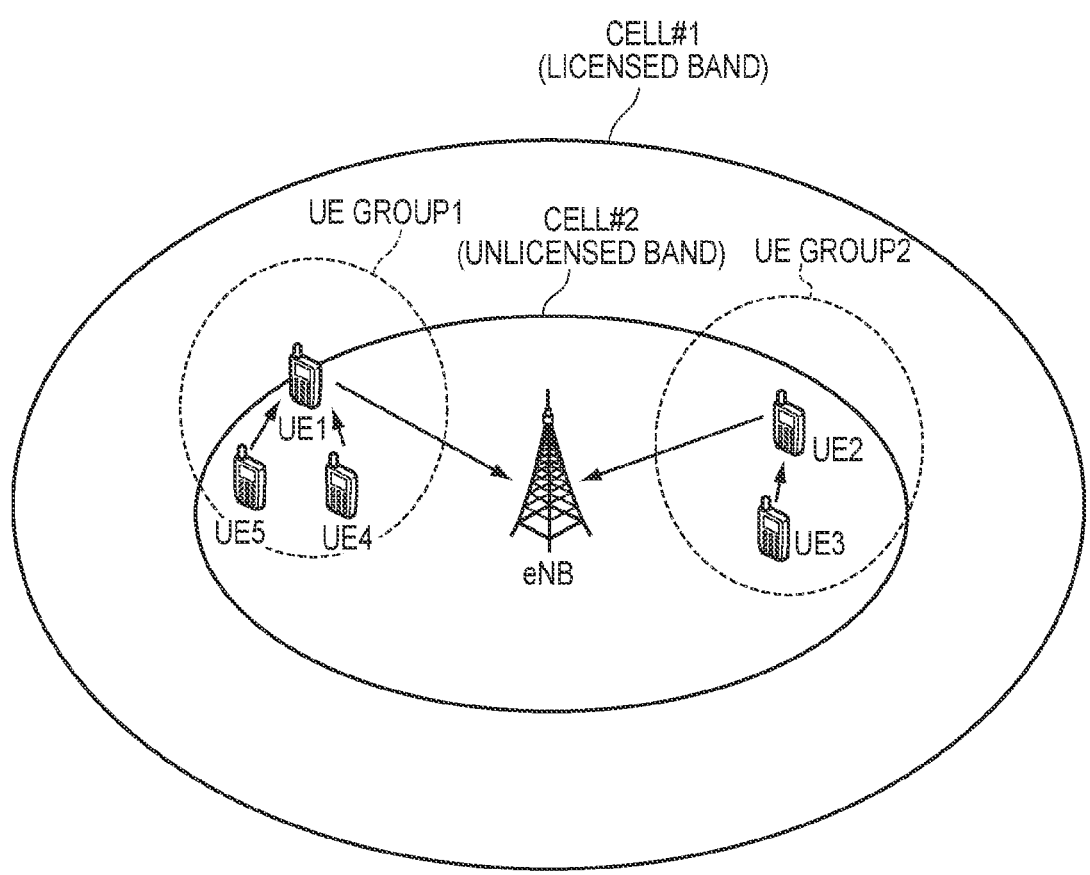
FIG. 12 is a view for describing an operation according to a first modified example of the second embodiment.

FIG. 12 is a view for describing an operation according to the first modified example of the second embodiment. As illustrated in FIG. 12, a UE 1, a UE 4, and a UE 5 are close to each other and form a UE group 1 including the UEs that are close to each other. In addition, a UE 2 and a UE 3 are close to each other and form a UE group 2 including the UEs that are close to each other. The UE group 1 and the UE group 2 are not close to each other. For example, the UE 1 transmits proximity UE notification, which indicates that the UE 1 is close to the UE 4 and the UE 5, to eNB 200. In addition, the UE 2 transmits proximity UE notification, which indicates that the UE 2 is close to the UE 3, to the eNB 200. The eNB 200 manages close UE information (adjacent UE information) based on the proximity UE notification.

Figure 13:
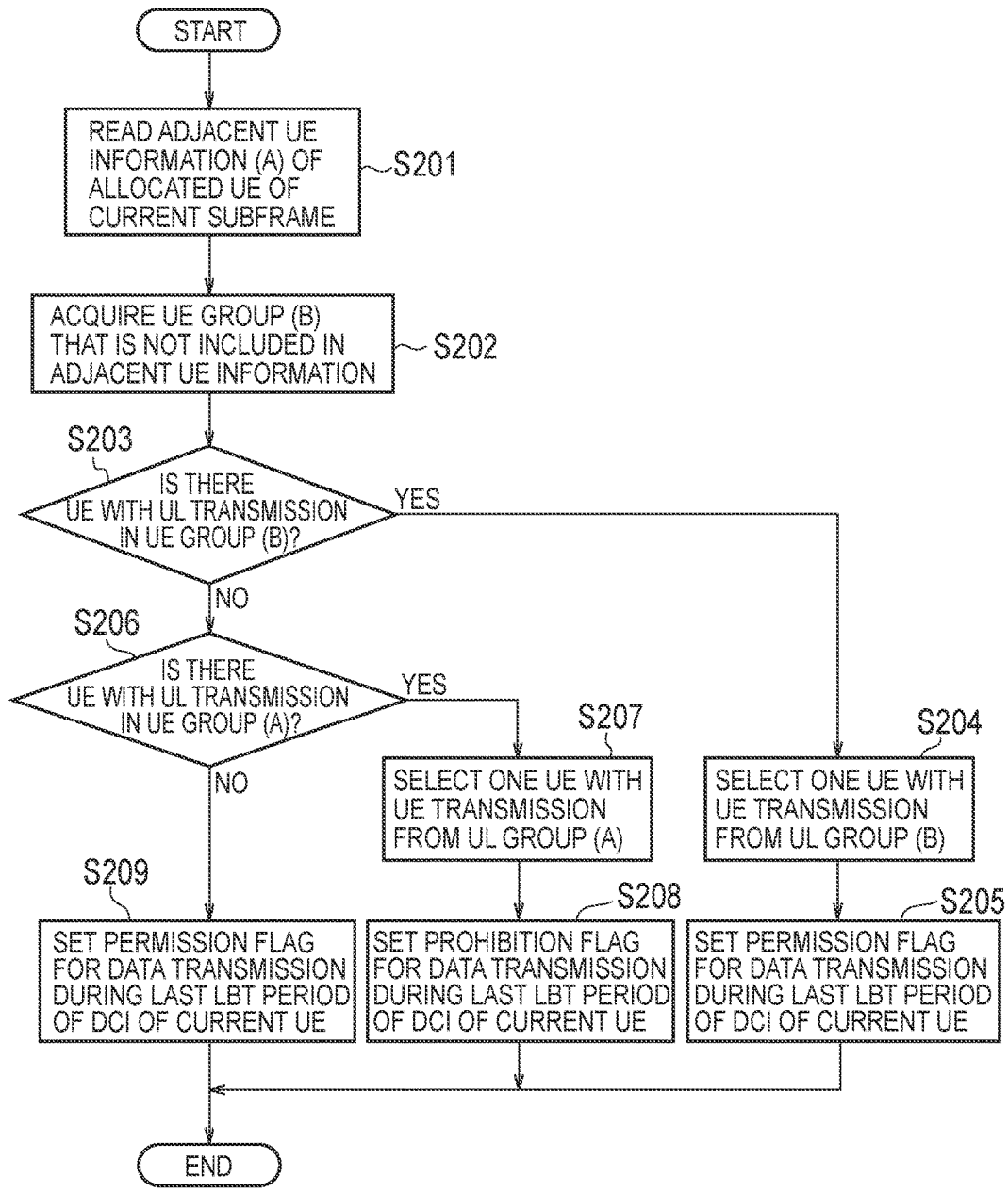
FIG. 13 is a flow diagram illustrating an example of a scheduling operation in the eNB according to the first modified example of the second embodiment.

FIG. 13 is a flow diagram illustrating an example of a scheduling operation in the eNB 200 according to the first modified example of the second embodiment.

As illustrated in FIG. 13, the eNB 200 reads the adjacent UE information (A) on an allocated UE of a current uplink subframe and information on a UE group (B) including UEs that are not adjacent to the allocated UE of the current uplink subframe (Steps S201 and S202).

When a UE with uplink transmission is included in the UE group (B) (Step S203: Yes), the eNB 200 selects the UE with the uplink transmission as an allocated UE of an uplink subframe subsequent to the current uplink subframe (Step S204). Incidentally, the eNB 200 can specify the UE with uplink transmission in response to a scheduling request (SR) or the like that is transmitted from the UE. Further, the eNB 200 transmits downlink control information (DCI) to the allocated UE of the current uplink subframe on the PDCCH (Step S205). Here, the eNB 200 causes a "transmission permission flag", which indicates that the transmission restriction (see the first embodiment) to restrict the transmission of the uplink signal is not performed during the last fixed section of an allocated subframe, to be included in the DCI.

On the other hand, when no UE with uplink transmission is included in the UE group (B) (Step S203: No), the eNB 200 determines whether or not there is a UE with uplink transmission in the UE group (A) (Step S206). When there is a UE with uplink transmission in the UE group (A) (Step S206: Yes), the eNB 200 selects the UE with the uplink transmission as an allocated UE of an uplink subframe subsequent to the current uplink subframe (Step S207). Further, the eNB 200 transmits downlink control information (DCI) to the allocated UE of the current uplink subframe on the PDCCH (Step S208). Here, the eNB 200 causes a "transmission prohibition flag", which indicates that the transmission restriction to restrict the transmission of the uplink signal is performed during the last fixed section of the allocated subframe, to be included in the DCI.

When no UE with uplink transmission is included in the UE group (A) (Step S206: No), the uplink subframe subsequent to the current uplink subframe is not allocated, and downlink control information (DCI) is transmitted to the allocated UE of the current uplink subframe on the PDCCH (Step S209). Here, the eNB 200 causes the "transmission permission flag", which indicates that the transmission restriction to restrict the transmission of the uplink signal is not performed during the last fixed section of the allocated subframe, to be included in the DCI. Incidentally, when the same UE is consecutively allocated even to the subsequent uplink subframe, the eNB 200 causes the "transmission permission flag", which indicates that the transmission restriction to restrict the transmission of the uplink signal is not performed during the last fixed section of the allocated subframe, to be included in the DCI.

In the flow of FIG. 13, the transmission permission flag or the transmission prohibition flag is transmitted through the PDCCH (DCI). However, quasi-static signaling (for example, RRC signaling) may be used without being limited to such dynamic signaling.

[Second Modified Example of Second Embodiment]

In the above-described second embodiment, the eNB 200 manages the adjacent UE information based on the proximity UE notification transmitted from the UE 100. However, the eNB 200 may manage the adjacent UE information based on position information (for example, GPS information) transmitted from the UE 100.

[Third Embodiment]

A difference of a third embodiment from the first embodiment and the second embodiment will be mainly described.

In the first modified example of the second embodiment, the UE 100 performs the transmission restriction (see the first embodiment) to restrict the transmission of the uplink signal during the last fixed section of the allocated subframe based on the instruction (transmission prohibition flag) from the eNB 200.

In regard to this, the UE 100 autonomously performs transmission restriction based on a radio signal received from other UE 100 in the third embodiment. For example, the UE 100 determines whether other UE 100 is present in the vicinity of the UE 100 based on a "LTE header" received from the other UE 100. Further, when there is the other UE 100 in the vicinity of the UE 100, the UE 100 performs the above-described transmission restriction.

The UE 100 notifies the eNB 200 that the transmission restriction is to be performed in the case of performing the transmission restriction. For example, the UE 100 includes a flag indicating that the transmission restriction is to be performed in the "LTE header" that is added to an uplink signal (data) to the eNB 200. Alternatively, the UE 100 may transmit the flag indicating that the transmission restriction is to be performed to the eNB 200 via a licensed band (cell #1). As a result, the eNB 200 can normally receive (decode) the uplink signal from the UE 100.

Alternatively, the UE 100 performs puncturing to discard an uplink signal (data) that needs to be transmitted within the last fixed section of an allocated subframe in the case of performing the transmission restriction. The eNB 200 decodes the discarded data by error correction decoding. Accordingly, when succeeding in the error correction decoding, the eNB 200 can normally receive (decode) the uplink signal from the UE 100. Incidentally, it is desirable to perform the puncturing when the UE 100 autonomously performs the transmission restriction. On the other hand, the puncturing may be performed or rate matching may be performed when the transmission restriction is instructed from the eNB 200 to the UE 100.

[Fourth Embodiment]

A difference of a fourth embodiment from the first to third embodiments will be mainly described.

In the above-described first to third embodiments, the FBE scheme is mainly assumed as the LBT scheme in the uplink. In regard to this, it is assumed a case where both the FBE scheme and the LBE scheme are defined as the LBT scheme in the uplink in the fourth embodiment.

A communication apparatus (the eNB 200 or the UE 100) according to the fourth embodiment is used in a mobile communication system defining the LBT to observe a use state of an unlicensed band channel within an LBT period before transmitting a radio signal in the channel. The communication apparatus includes a controller (the controller 230 or the controller 130), which selects any one of the FBE and the LBE schemes, as an LBT scheme that needs to be used by a communication partner device or an LBT scheme that needs to be used by the communication apparatus. An example in which the communication apparatus is the eNB 200 and the communication partner device is the UE 100 will be described in the fourth embodiment. In the fourth embodiment, the controller 230 of the eNB 200 selects any one of the FBE and the LBE schemes based on a degree of congestion of the unlicensed band channel and/or a characteristic of data.

The transmitter 210 of the eNB 200 according to the fourth embodiment transmits LBT setting information to designate any one of the FBE scheme and the LBE scheme to the UE 100. The receiver 110 of the UE 100 receives the LBT setting information to designate any one of the FBE scheme and the LBE scheme from the eNB 200. The LBT setting information may be RRC signaling (for example, an individual RRC message) or physical layer signaling (DCI). The controller 130 of the UE 100 switches the LBT scheme in the uplink based on the LBT setting information.

Each of the FBE scheme and the LBE scheme has an advantage and a disadvantage. Thus, it is possible to take the respective advantages of the FBE scheme and the LBE scheme by enabling the FBE scheme and the LBE scheme to be dynamically set for each of the UEs 100 (or each cell).

Here, the advantage of the FBE scheme is that implementation is easy, and as a result, there is little influence on a WLAN system. The disadvantage of the FBE scheme is that the scheme tends to be interrupted by the WLAN system and LTE is weak (that is, a channel occupancy rate of LTE is low).

In addition, the advantage of the LBE scheme is that LTE is strong (that is, a channel occupancy rate of LTE is high) since LBT can be started from anywhere in a subframe. The disadvantage of the LBE scheme is that a utilization efficiency of a radio resource is poor because it requires a channel to wastefully occupy a band called a "reservation channel".

Figure 14:
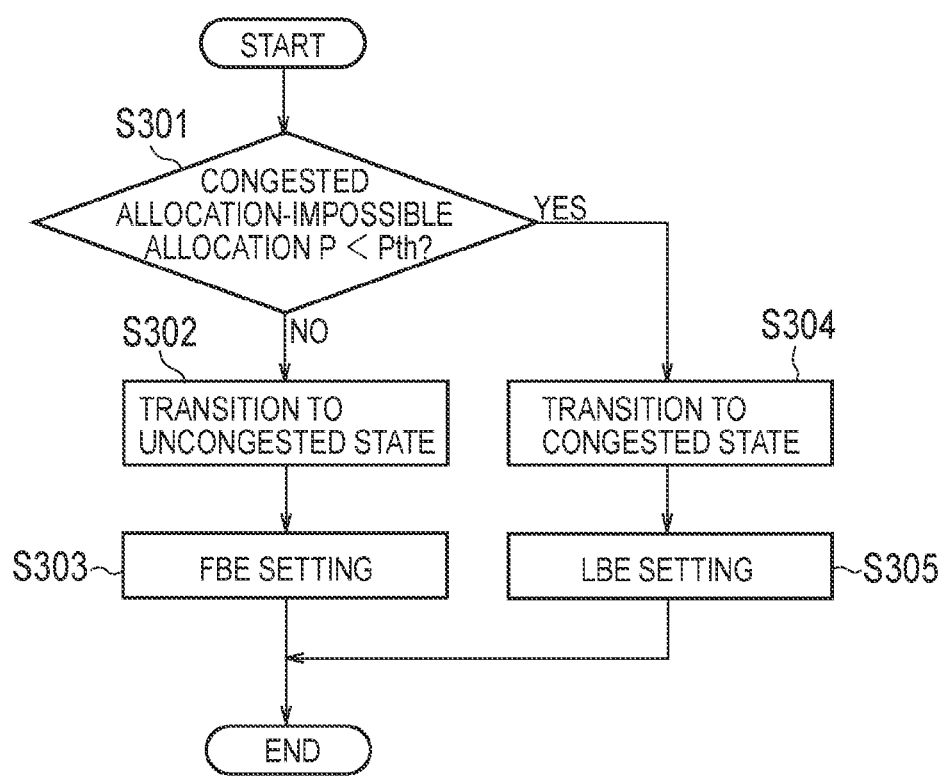
FIG. 14 is a flow diagram illustrating Operation Example 1 of the eNB according to a fourth embodiment.

FIG. 14 is a flow diagram illustrating Operation Example 1 of the eNB 200 according to the fourth embodiment. As illustrated in FIG. 14, the controller 230 of the eNB 200 calculates a ratio P of uplink subframes actually used for uplink transmission (that is, passing through the LBT) among uplink subframes allocated to the UE 100. Further, when the ratio P is lower than a threshold value (Pth) (Step S301: Yes), the controller 230 sets the LBE scheme for the UE 100 (Steps S304 and S305). On the other hand, when the ratio P is the threshold value (Pth) or higher (Step S301: No), the controller 230 sets the FBE scheme for the UE 100 (Steps S302 and S303).

Figure 15:
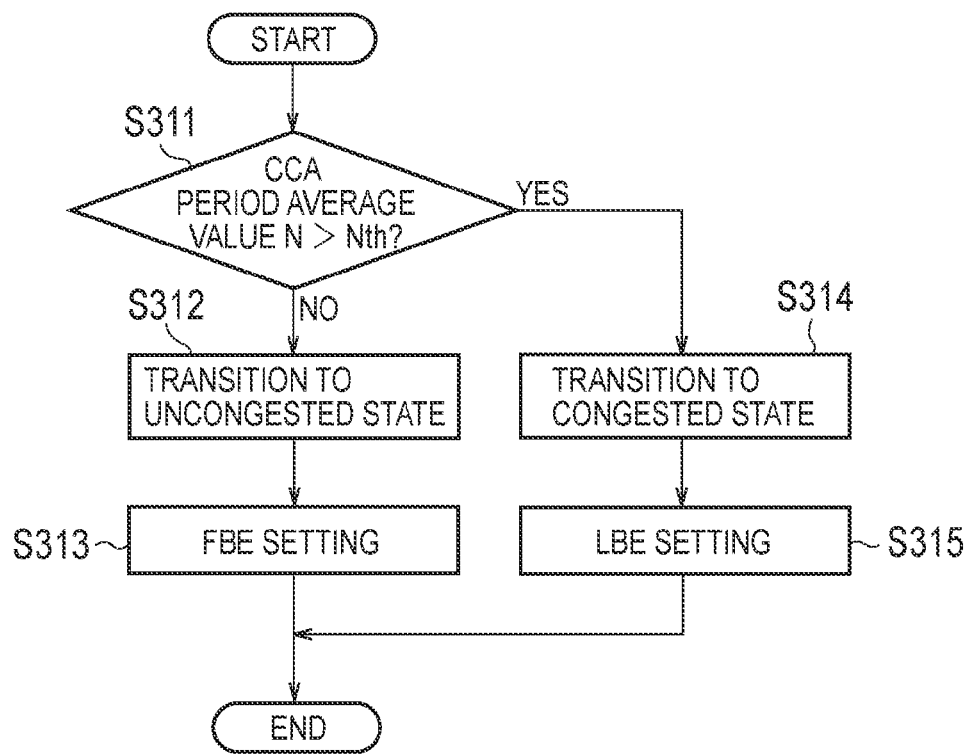
FIG. 15 is a flow diagram illustrating Operation Example 2 of the eNB according to the fourth embodiment.

FIG. 15 is a flow diagram illustrating Operation Example 2 of the eNB 200 according to the fourth embodiment. As illustrated in FIG. 15, the controller 230 of the eNB 200 calculates an average value N of an LBT period (CCA period) that has been required until the UE 100 performs uplink transmission (data transmission). Information on the LBT period (CCA period) that has been required until the uplink transmission (data transmission) is performed is notified from the UE 100 to the eNB 200 using, for example, an "LTE header". Further, when the average value N is higher than a threshold value (Nth) (Step S311: Yes), the controller 230 sets the LBE scheme for the UE 100 (Steps S314 and S315). On the other hand, when the average value N is the threshold value (Nth) or lower (Step S311: No), the controller 230 sets the FBE scheme for the UE 100 (Steps S312 and S313).

Figure 16:
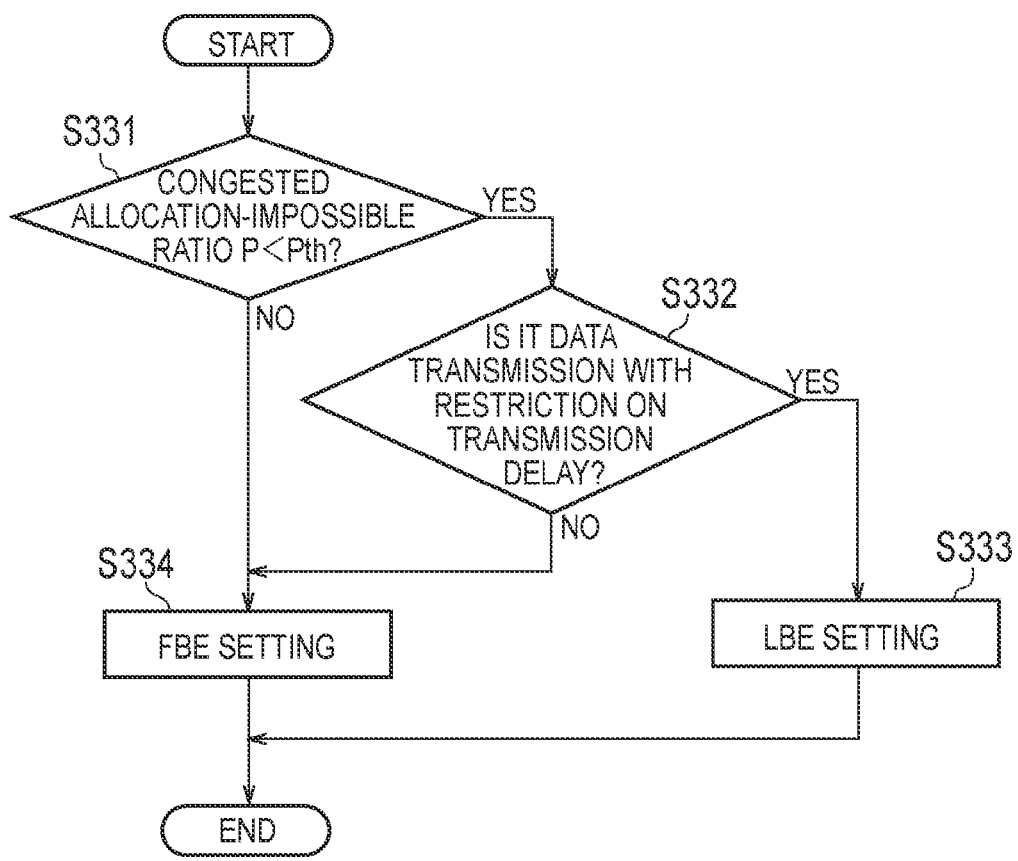
FIG. 16 is a flow diagram illustrating Operation Example 3 of the eNB according to the fourth embodiment.

FIG. 16 is a flow diagram illustrating Operation Example 3 of the eNB 200 according to the fourth embodiment. As illustrated in FIG. 16, the controller 230 of the eNB 200 calculates a ratio P of uplink subframes actually used for uplink transmission (that is, passing through the LBT) among uplink subframes allocated to the UE 100. When the ratio P is lower than a threshold value (Pth) (Step S331: Yes), the controller 230 determines whether or not the UE 100 is performing data transmission (such as voice communication) with restriction on a transmission delay (Step S332). When the UE 100 is performing the data transmission with the restriction on the transmission delay (Step S332: Yes), the controller 230 sets the LBE scheme for the UE 100 (Step S333). On the other hand, when the ratio P is the threshold value (Pth) of higher (Step S331: No) or when the UE 100 is not performing the data transmission with the restriction on the transmission delay (Step S332: No), the eNB 200 sets the FBE scheme for the UE 100 (Step S334).

Incidentally, each flow illustrated in FIGS. 14 to 16 is not limited to the case of being executed by the eNB 200, and may be executed by the UE 100. That is, the UE 100 autonomously selects any one of the FBE and the LBE schemes as the LBT scheme that needs be used by the UE 100.

Further, the operation according to the fourth embodiment is applicable not only to the uplink but also to the downlink. In this case, the eNB 200 may autonomously select any one of the FBE and the LBE schemes as the LBT scheme that needs to be used by the eNB 200.

[First Modified Example of Fourth Embodiment]

In a first modified example of the fourth embodiment, the eNB 200 or the UE 100 selects any one of the FBE and the LBE schemes based on a scheme (FBE/LBE) of the LBT that is being used by other detected communication apparatus.

It is assumed that the FBE is weakened when the LBE and the FBE are mixed. Accordingly, when the eNB 200 or the UE 100 detects the FBE of a peripheral communication apparatus (a peripheral eNB or UE), it is preferable to select the FBE.

Incidentally, each communication apparatus (each eNB or UE) may transmit an LBT scheme (FBE/LBE) that the device is using, for example, in the state of being included in an "LTE header". Accordingly, the LBT scheme that is being used by one communication apparatus can be grasped by other communication apparatus.

[Second Modified Example of Fourth Embodiment]

In a second modified example of the fourth embodiment, the eNB 200 or the UE 100 selects the FBE in response to start of uplink communication. For example, when the eNB 200 starts allocation of an unlicensed band with respect to the UE 100, the scheme transitions to the FBE. Alternatively, the scheme transitions to the FBE when the eNB 200 detects the uplink communication.

[Fifth Embodiment]

A fifth embodiment will be described hereinafter with reference to FIGS. 17A and 17B.

A UE transmits data in an uplink and an eNB transmits data in a downlink in the same unlicensed carrier (license-free band). That is, the data transmission in the uplink of the UE and the data transmission in the downlink of the eNB are switched depending on time in the same unlicensed carrier.

Figure 17A:
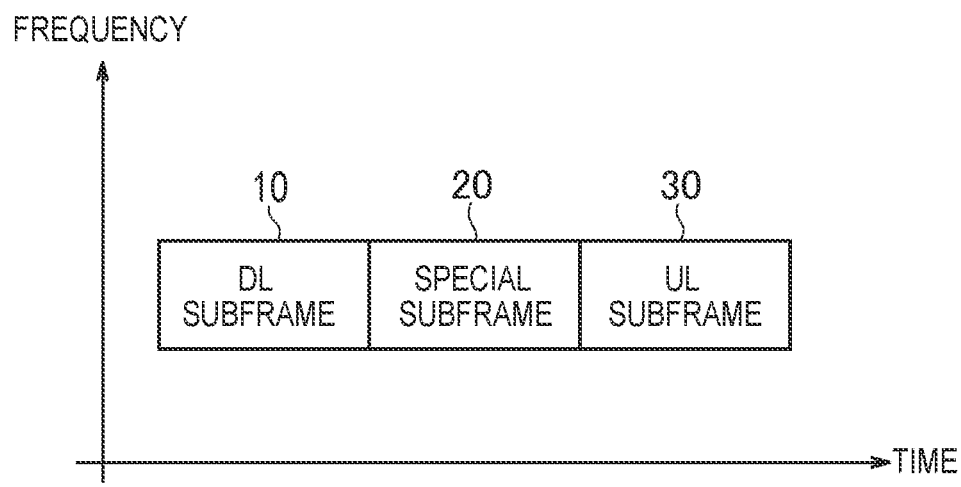
FIGS. 17A and 17B are views illustrating a fifth embodiment.

FIG. 17A is a view illustrating switching of traffic from the downlink (DL) to the uplink (UL). The eNB transmits downlink data in a subframe 10. When the eNB ends the transmission of the downlink data, the UE transmits the uplink data during a subframe 20 (a special subframe). A control signal indicating the special subframe to the UE may be provided.

Figure 17B:
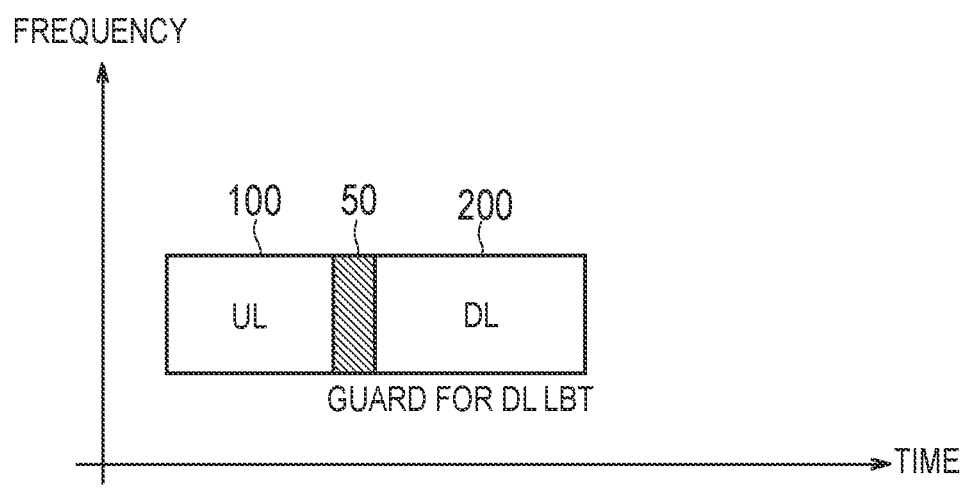

FIG. 17B is a view illustrating switching of traffic from the uplink (UL) to the downlink (DL).

The UE transmits the uplink data in a subframe 100, and then, the eNB transmits the downlink data in a subframe 200. After ending the transmission of the uplink data in the subframe 100, the UE deletes the last symbol of an uplink subframe (does not transmit the uplink data). Accordingly, a period 50 to suppress data transmission in the uplink of the UE is provided for the listen before talk (LBT) of the downlink (DL). The eNB performs the LBT during the period 50 to suppress the uplink data transmission of the UE, and then, transmits the downlink data in the subframe 200. The eNB instructs the UE to suppress transmission at the last symbol of the uplink subframe. Accordingly, it is possible to reduce failure of the LBT of the eNB.

The period 50 to suppress the transmission of the downlink data (or reception of the uplink data) may be provided by deleting the last symbol of the subframe 100 used for the transmission of the uplink data. Alternatively, the period 50 may be provided by deleting the first symbol of the subframe 200 used for the transmission of the downlink data.

[Sixth Embodiment]

Figure 18:
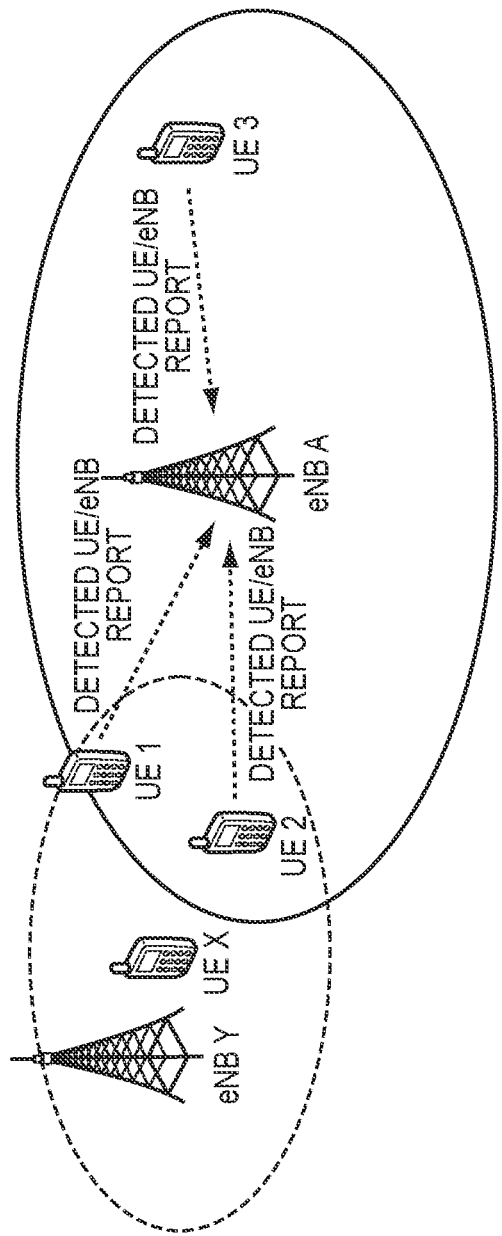
FIG. 18 is a view illustrating a sixth embodiment.

A sixth embodiment will be described hereinafter with reference to FIG. 18.

The sixth embodiment relates to a method in which an eNB selects two UEs, which serve as a pair of uplink multiuser MIMO based on a measurement report from each US in license assisted access (LAA) utilizing LTE in a license-free band, as an example. Incidentally, three or more UEs may be selected without being limited to two UEs as the number of UEs selected as a target of the multiuser MIMO.

The respective UEs 1 to 3 measure an initial signal (header) and/or a DRS transmitted from a peripheral UE and/or eNB. Incidentally, the initial signal (header) and/or the DRS includes at least one of operator information (an operator ID), cell information (a cell ID), and UE information (a UE ID). As an example, the initial signal and/or the DRS transmitted from the eNB may include at least the cell information. The initial signal and/or the DRS transmitted from the UE may include the UE information. Here, the initial signal (Header) and/or the DRS may be transmitted periodically or at start of data from the UE and/or the eNB.

Next, the respective UEs 1 to 3 transmit each measurement result of the initial signal (header) and/or the DRS to an eNB A as the measurement report. Here, the respective UEs may perform the measurement report periodically or when a predetermined condition is satisfied (when a signal of power of a certain level or more is detected). The measurement report may include at least any one of RSSI, RSRP and RSRQ of the peripheral UE and/or eNB. In addition, the measurement report may include at least information (an ID) of the peripheral UE and/or eNB detected by each of the UEs 1 to 3.

Here, the measurement results of the UE 1 and the UE 2 include at least information of a UE X and/or information indicating an eNB Y. Incidentally, the UE 1 and the UE 2 are present inside a cell coverage area that is managed by the UE X and the eNB Y.

The eNB A selects two UEs serving as a pair of multiuser MIMO based on the measurement reports transmitted from the respective UEs 1 to 3. Here, the eNB A does not select the UE 1 and the UE 2 as the pair of multiuser MIMO (prohibits the selection thereof) since the measurement reports transmitted from the UE 1 and the UE 2 include the information of the UE X and/or the information of the eNB Y which are the same as each other. In addition, the eNB A selects the UE I or the UE 2 and the UE 3 as the pair of multiuser MIMO since the information of the UE X and the information of the eNB Y included in the measurement report transmitted from the UE 1 or 2 are not included in the measurement report transmitted from the UE 3.

Therefore, the eNB A selects the UE 1 or the UE 2 and UE 3 as the pair of multiuser MIMO for which the UE X and the eNB Y included in the measurement results of the UEs 1 to 3 do not overlap each other among the plurality of UEs 1 to 3.

In addition, the UE 1 or the UE 2 and the UE 3 may be selected as the pair of multiuser MIMO when an overlapping ratio between the information of the UE and/or the eNB included in the measurement result of the UE 1 and/or the UE 2 and the information of the UE and/or the eNB included in the measurement result of the UE 3 is lower than an overlapping ratio between the information of the UE and/or the eNB included in the measurement result of the UE 1 and the information of the UE and/or the eNB included in the measurement result of the UE 2, as another example.

Incidentally, the description has been given on the premise of the uplink multiuser MIMO in the sixth embodiment, but the disclosure may be applied to downlink multiuser MIMO.

[Other Embodiments]

In the above-described first to third embodiments, the transmission restriction to restrict the transmission of the uplink signal is performed during the last fixed section of the uplink subframe (uplink transmission period). However, the disclosure is not limited to the case of performing the transmission restriction for the last fixed section of the uplink subframe, but the transmission restriction may be performed for the first fixed section of the uplink subframe. In this case, the eNB 200 may instruct the UE 100 to perform the transmission restriction for the first fixed section of the uplink subframe. When the transmission restriction is performed for the first fixed section, a determination timing of the eNB 200 is delayed, and a small margin is given to the eNB 200. When the transmission restriction is performed for the last fixed section of the uplink subframe, it is necessary to perform scheduling, in advance, regarding the allocation of an uplink subframe subsequent to the uplink subframe. When the transmission restriction is performed for the first fixed section, such scheduling becomes unnecessary.

In the embodiments described above, the example in which the uplink transmission period is the uplink subframe has been described. However, the uplink transmission period may be a period (for example, a slot) shorter than the uplink subframe.

In the embodiments described above, the example in which the same eNB 200 manages the cell #1 (licensed band) and the cell #2 (unlicensed band) has been described. However, the present disclosure can also be applied to a case where different eNBs 200 manage the cell #1 (licensed band) and the cell #2 (unlicensed band).

In the embodiments described above, the LTE system is exemplified as the mobile communication system. However, the present disclosure is not limited to the LTE system. The present disclosure may be applied to a system other than the LTE system.

[Additional Note 1]

(1. Introduction)

So far, discussions in RAN1 are only focused on the DL-only LAA. In the additional notes, we consider the functionalities of UL LAA especially for the UL grant and the UL LBT.

(2. Consideration on UL Grant)

Figure 19:
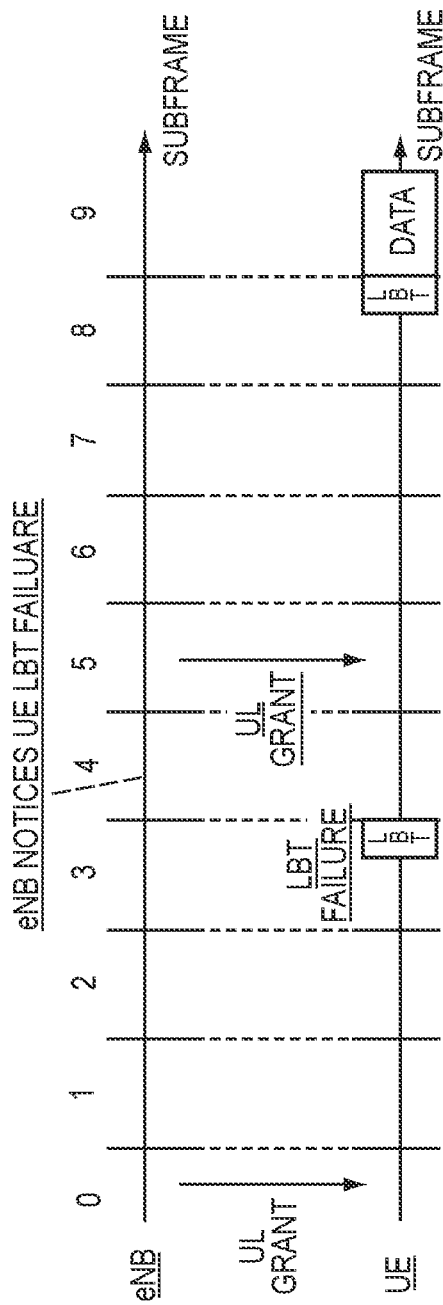
FIG. 19 is a view illustrating an example of a delay of UL transmission according to an appendix.
Figure 20:
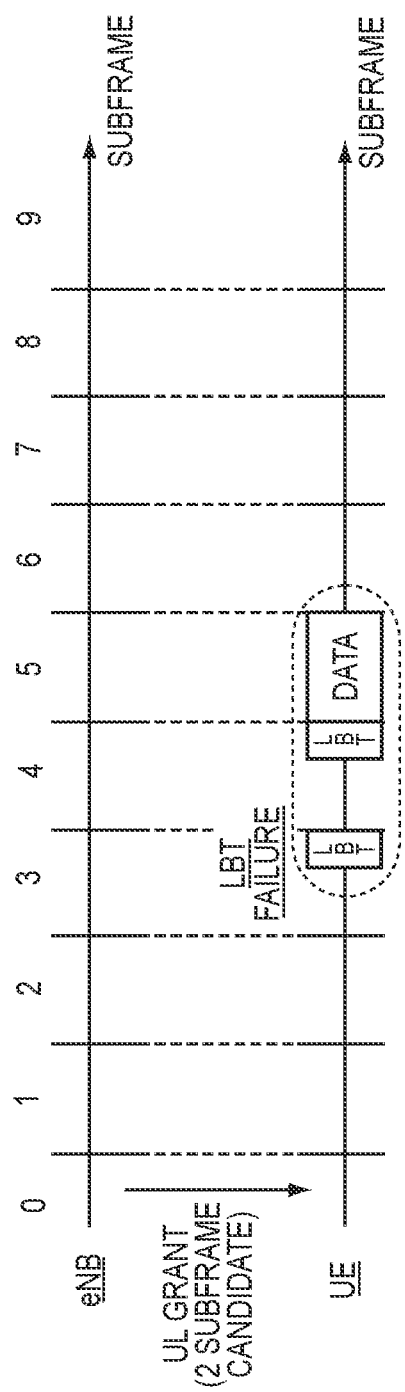
FIG. 20 is a view illustrating an example of a proposed UL grant according to the appendix.

FIG. 19 illustrates an example of the delay of UL transmission. FIG. 20 illustrates an example of proposed UL grant.

In UL LAA, we believe UE should perform LBT before the UL transmission. Therefore, UEs must have some flexibility to decide if they should transmit data. Unlike licensed LTE, eNB cannot control the exact timing of UL transmission. FIG. 19 shows the delay in a UL Transmission when UL grant is transmitted to the UE. As shown in the figure after the eNB sends an UL grant to the UE, the UE may not be able to transmit its data in the required subframe due to the LBT failure. In addition, if the eNB sends another UL grant next UL data transmission opportunity may not occur for a long period of time, causing a large delay in the UL LAA transmissions.

Therefore, we propose two or more potential subframes as the data transmission opportunities to be indicated in one UL grant sent by the serving eNB.

Proposal 1: Two or more candidate subframes should be indicated in one UL grant for UL LAA.

In addition, we support 1 UE occupy the whole bandwidth in UL transmission because eNB cannot exactly control UE transmission due to UE LBT. In such case, the UL grant DCI bits used for indicating the frequency position of resource blocks can be deleted and the bits for candidate subframe should be added.

Furthermore, in UL, Synchronous HARQ cannot be achieved due to UL LBT. Process IDs of HARQ can be indicated by eNB or it is possible that UE automatically select them and piggyback them with Data.

Proposal 2: In UL LAA, one UE should use the whole bandwidth in one channel.

Proposal 3: The UL grant DCI bits used for indicating the frequency position of resource blocks can be deleted and the bits for the candidate subframes should be added.

Proposal 4: Asynchronous HARQ should be supported in UL LAA.

(3. Issue on UL LBT)

Figure 21:
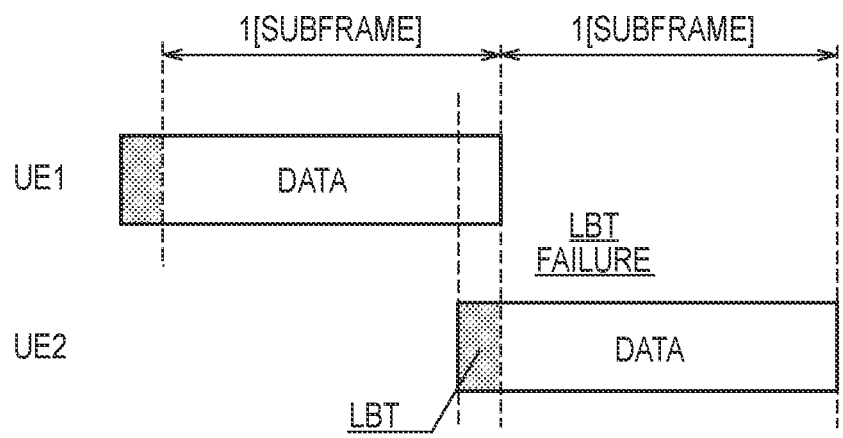
FIG. 21 is a view illustrating an example of consecutive transmission between two UEs according to the appendix.

FIG. 21 illustrates an example of continuous transmission between 2 UEs.

In this section, we consider another issue related to the UL LBT. As shown in FIG. 21, if the eNB allocate the continuous subframes for multiple UEs (UE1 and UE2), then it is possible one of the UEs may experience LBT failure.

Therefore, we propose eNB should be able to send an indication to the UE 1 to omit the last symbol in order to coordinate a continuous transmission with the second UE 2. This indication should be included in UL grant because the need for omitting the last symbol changes dynamically.

Proposal 5: eNB should be able to send an indication to the UE to omit transmitting the last symbol.

[Additional Note 2]

(Introduction)

It the previous meeting the UL LAA was discussed. In this additional note, we consider further details of the functionalities of the UL LAA especially for DL/UL switching.

(DL and UL Switching)

Figure 22:
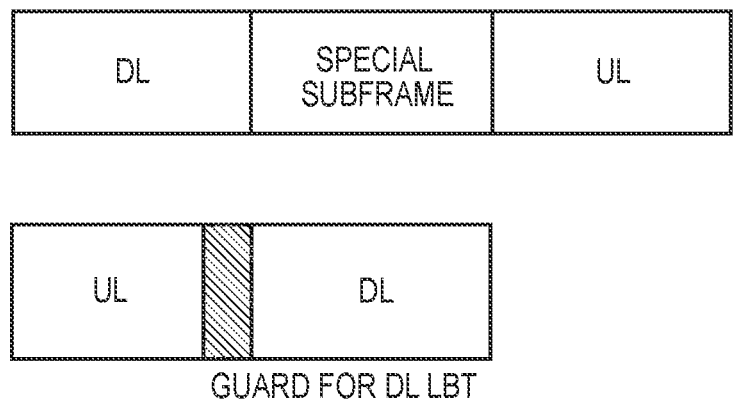
FIG. 22 is a view illustrating switching from a DL to a UL and switching from the UL to the DL according to the appendix.

In this section, we focus on the DL and UL switching for DL+UL LAA. In the case of DL to UL switching, special subframe (see FIG. 22 top) should be specified. The number of this special subframe should be smaller. On the other hand, we believe the eNB should have the flexibility to schedule the switching between the DL and the UL. This approach is different from the existing TDD-frame configuration in the current specification. If we apply the existing TDD fixed DL/UL configuration then the eNB has to wait for the switching time when either DL or UL has no data for transmission. FIG. 22 is an example of DL to UL switching and UL to DL switching. As shown in this figure, we believe in case of UL to DL switching, RAN1 should consider the guard period for DL LBT at the end of the UL transmission.

Proposal: The eNB should have the flexibility to schedule the DL to UL switching occasion and the UL to DL switching occasion.

Proposal: RAN1 should consider the guard period for DL LBT at the end of the UL transmission.

[Additional Note 3]

The Nominal Channel Bandwidth shall be at least 5 MHz at all times. The Occupied Channel Bandwidth shall be between 80% and 100% of the declared Nominal Channel Bandwidth. In case of smart antenna systems (devices with multiple transmit chains) each of the transmit chains shall meet this requirement.

Figure 23:
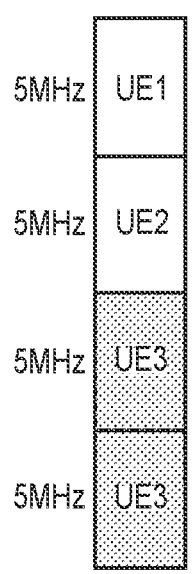
FIG. 23 is a view illustrating an example of multiplexing in a frequency domain for an LAA according to the appendix.

In order to meet this regulation, we believe a UE have to transmit at least a 5 MHz wide signal. Considering LBT, it's not possible to share 5 MHz with multiple UEs. In addition, the transmission should be permitted in multiples of 5 MHz and the start frequency position should be also as multiples of 5 MHz. If 20 MHz is available for LAA, only 4 UEs can be multiplexed in frequency domain as shown in FIG. 23.

Proposal 1: In UL LAA each UE should use at least 5 MHz. The transmission should be permitted in multiples of 5 MHz and the start frequency position should also be as a multiple of 5 MHz.

Figure 24:
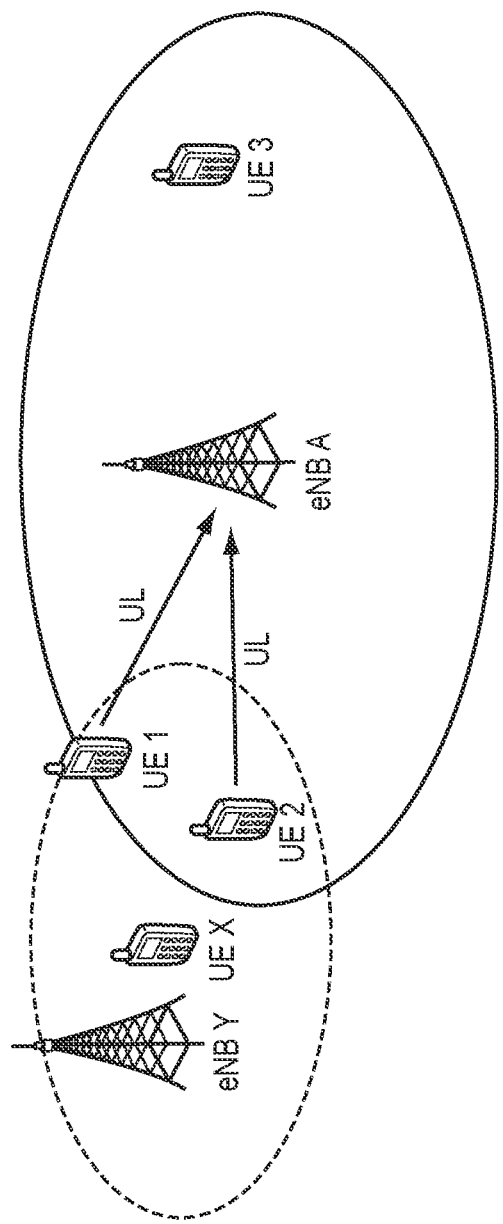
FIG. 24 is a view illustrating an example of a pair unsuitable for MU-MIMO according to the appendix.
Figure 25:
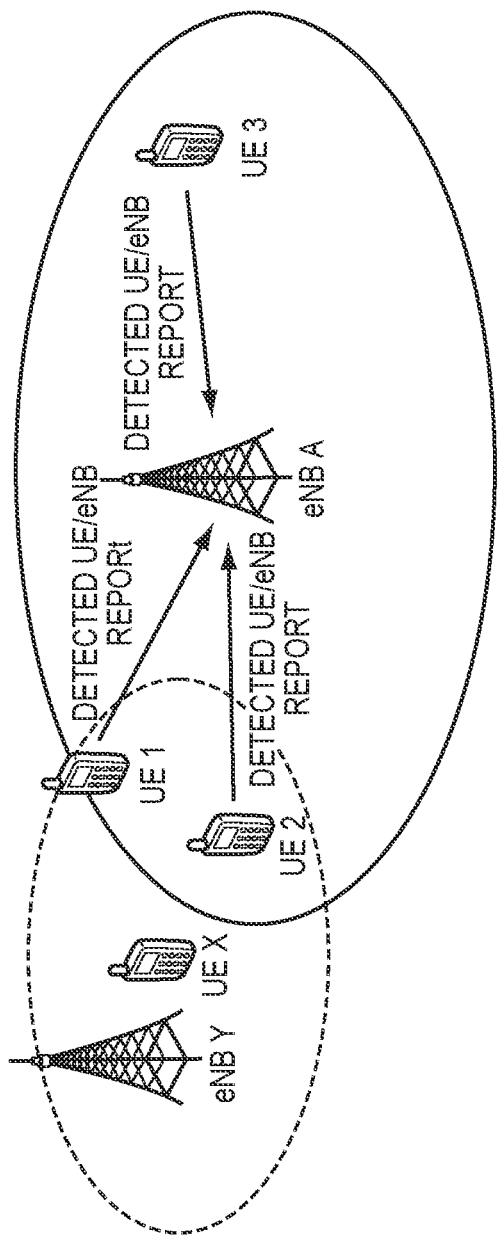
FIG. 25 is a view illustrating a measurement report proposed for MU-MIMO according to the appendix.

FIG. 24 illustrates an example of non-suitable pair for MU-MIMO. FIG. 25 illustrates a proposed measurement report for MU-MIMO.

In this section, we consider the suitable UE-pairing for MU-MIMO. As shown in FIG. 24, the pairing of UE1 and UE2 is not suitable for MU-MIMO because if UE X or eNB Y start the transmission, both UE1 and UE2 cannot send data due to LBT failure. On the other hand, if UE 1 and UE3 were paired then it would have been a successful transmission using MU-MIMO because UE3 would be able to transmit.

Therefore, we believe some mechanism is needed such that the eNB can choose the suitable pair for MU-MIMO. One approach is the UEs can send a report to its serving cell that indicates all the neighboring UEs and the eNBs detected by the UE on the LAA carrier. Using the above example, if all the UEs send a report to eNB A then eNB A may not pair UE1 and UE 2 for a MU-MIMO transmission.

Proposal 2: LAA should support UEs to send a report to its serving cells to indicate the detected UEs and eNBs on the LAA carrier.

The invention claimed is:

1. A user terminal in a mobile communication system, comprising:
   a transmitter configured to transmit an uplink signal within an uplink subframe allocated by a base station, to the base station, in an unlicensed band;
   a receiver configured to receive, from the base station, a first instruction that instructs to stop transmission of the uplink signal in a last symbol of the uplink subframe; and
   a controller configured to stop transmission of the uplink signal in the last symbol of the uplink subframe, in response to receiving the first instruction, wherein
   the receiver is further configured to receive, from the base station, a second instruction that instructs to stop transmission of the uplink signal in a predetermined beginning period of the uplink subframe; and
   the controller is further configured to stop transmission of the uplink signal in the predetermined beginning period of the uplink subframe, in response to receiving the second instruction.

2. A base station in a mobile communication system, comprising:
   a receiver configured to receive an uplink signal within an uplink subframe allocated by the base station, from a user terminal, in an unlicensed band; and
   a transmitter configured to transmit, to the user terminal, a first instruction that instructs to stop transmission of the uplink signal in a last symbol of the uplink subframe, wherein
   the transmitter is further configured to transmit to the user terminal, a second instruction that instructs to stop transmission of the uplink signal in a predetermined beginning period of the uplink subframe.

3. A communication control method in a mobile communication system, comprising:
   allocating, by a base station, an uplink subframe used by a user terminal to transmit an uplink subframe in an unlicensed band;
   transmitting, from the base station to the user terminal, a first instruction that instructs to stop transmission of the uplink signal in a last symbol of the uplink subframe;
   transmitting, from the user terminal to the base station, an uplink signal within the uplink subframe, in an unlicensed band;
   stopping transmission of the uplink signal in the last symbol within the uplink subframe, in response to receiving the first instruction;
   transmitting, from the base station to the user terminal, a second instruction that instructs to stop transmission of the uplink signal in a predetermined beginning period of the uplink subframe; and
   stopping by the user terminal, transmission of the uplink signal in the predetermined beginning period of the uplink subframe, in response to receiving the second instruction.

* * * * *